(12) United States Patent
Khandani

(10) Patent No.: US 9,820,311 B2
(45) Date of Patent: Nov. 14, 2017

(54) ADAPTER AND ASSOCIATED METHOD FOR FULL-DUPLEX WIRELESS COMMUNICATION

(71) Applicant: Amir Keyvan Khandani, Kitchener (CA)

(72) Inventor: Amir Keyvan Khandani, Kitchener (CA)

( * ) Notice: Subject to any disclaimer, the term of this patent is extended or adjusted under 35 U.S.C. 154(b) by 430 days.

(21) Appl. No.: 14/451,672

(22) Filed: Aug. 5, 2014

(65) Prior Publication Data

US 2015/0215937 A1    Jul. 30, 2015

Related U.S. Application Data

(60) Provisional application No. 61/933,395, filed on Jan. 30, 2014, provisional application No. 61/943,632, filed on Feb. 24, 2014, provisional application No. 62/006,458, filed on Jun. 2, 2014.

(51) Int. Cl.
*H04W 76/02* (2009.01)
*H04B 1/525* (2015.01)
*H04L 1/00* (2006.01)
*H04B 7/04* (2017.01)

(52) U.S. Cl.
CPC ............ *H04W 76/02* (2013.01); *H04B 1/525* (2013.01); *H04L 1/00* (2013.01); *H04B 7/04* (2013.01)

(58) Field of Classification Search
CPC ...................................................... H04B 1/123
See application file for complete search history.

(56) References Cited

U.S. PATENT DOCUMENTS

| 4,268,727 A | 5/1981 | Agrawal |
| 4,750,165 A | 6/1988 | Champagne |
| 5,383,224 A | 1/1995 | Mizoguchi |

(Continued)

FOREIGN PATENT DOCUMENTS

| GB | 1091437 | 11/1967 |
| JP | 10502220 A | 2/1998 |

(Continued)

OTHER PUBLICATIONS

Provisional Application, entitled: "Adaptive Non-Linear Digital Cancellation for Full-Duplex Radios", U.S. Appl. No. 61/864,453, filed Aug. 9, 2013.

(Continued)

*Primary Examiner* — Ian N Moore
*Assistant Examiner* — Ronald h Davis
(74) *Attorney, Agent, or Firm* — Invention Mine LLC

(57) ABSTRACT

An adapter for enabling full-duplex wireless communications is described, along with methods for operating the adapter. The adapter operates as an intermediary between a transmit antenna and receive antenna on the one hand, and a transceiver on the other hand. The adapter communicates with the transceiver using different frequencies for outbound and inbound radio-frequency signals. However, with respect to the transmit antenna and receive antenna, the adapter transmits outbound and receives inbound radio frequency signals using the same frequency. The adapter includes cancellation circuitry to reduce the self-interference cause by transmitting and receiving on the same frequency.

24 Claims, 14 Drawing Sheets

(56) References Cited

U.S. PATENT DOCUMENTS

| | | | |
|---|---|---|---|
| 5,691,978 | A | 11/1997 | Kenworthy |
| 6,608,864 | B1 | 8/2003 | Strait |
| 6,621,876 | B2 | 9/2003 | Camp, Jr. |
| 6,745,009 | B2 | 6/2004 | Raghothaman |
| 6,917,597 | B1 | 7/2005 | Schmidl |
| 7,002,518 | B2 | 2/2006 | Lin |
| 7,065,036 | B1 | 6/2006 | Ryan |
| 7,091,894 | B2 | 8/2006 | Fudge |
| 7,096,042 | B2 | 8/2006 | Marinier |
| 7,184,466 | B1 | 2/2007 | Seemann et al. |
| 7,187,907 | B2 | 3/2007 | Widrow |
| 7,221,688 | B2 | 5/2007 | Vanness |
| 7,272,366 | B2 | 9/2007 | Haapoja |
| 7,346,100 | B2 | 3/2008 | Kumar |
| 7,482,058 | B2 | 1/2009 | Ahmed |
| 7,627,325 | B2 | 12/2009 | McCoy |
| 7,693,174 | B2 | 4/2010 | Ishibashi |
| 7,706,744 | B2 | 4/2010 | Rodgers |
| 7,817,641 | B1 | 10/2010 | Khandani |
| 7,920,539 | B2 | 4/2011 | Stanford |
| 7,944,871 | B2 | 5/2011 | Imamura |
| 7,991,160 | B2 | 8/2011 | Guccione |
| 8,023,438 | B2 | 9/2011 | Kangasmaa |
| 8,031,744 | B2 | 10/2011 | Radunovic |
| 8,064,502 | B2 | 11/2011 | Sawai |
| 8,107,906 | B2 | 1/2012 | Lum |
| 8,175,535 | B2 | 5/2012 | Mu |
| 8,208,628 | B2 | 6/2012 | Yener |
| 8,238,551 | B2 | 8/2012 | Reznik |
| 8,280,046 | B2 | 10/2012 | Rudolf |
| 8,306,480 | B2 | 11/2012 | Muhammad |
| 8,351,874 | B2 | 1/2013 | Dent |
| 8,373,582 | B2 | 2/2013 | Hoffberg |
| 8,401,196 | B2 | 3/2013 | Goldberg |
| 8,498,585 | B2 | 7/2013 | Vandenameele |
| 8,629,650 | B2 | 1/2014 | Mohammadian |
| 8,744,377 | B2 | 6/2014 | Rimini |
| 8,767,869 | B2 | 7/2014 | Rimini |
| 8,837,615 | B2 | 9/2014 | Baldemair |
| 8,897,269 | B2 | 11/2014 | Ji |
| 8,918,692 | B2 | 12/2014 | Braithwaite |
| 8,976,641 | B2 | 3/2015 | Choi |
| 9,036,749 | B2 | 5/2015 | Choi |
| 9,054,795 | B2 | 6/2015 | Choi |
| 9,071,313 | B2 | 6/2015 | Monsen |
| 9,077,421 | B1 | 7/2015 | Mehlman |
| 9,130,693 | B2 | 9/2015 | Reznik |
| 9,276,682 | B2 | 3/2016 | Bharadia |
| 2003/0189975 | A1 | 10/2003 | Fullerton |
| 2005/0083863 | A1 | 4/2005 | Umei |
| 2007/0036353 | A1 | 2/2007 | Reznik |
| 2007/0082617 | A1 | 4/2007 | McCallister |
| 2008/0009257 | A1 | 1/2008 | Safarian et al. |
| 2009/0141900 | A1 | 6/2009 | Ye |
| 2010/0020771 | A1 | 1/2010 | Ji |
| 2010/0086012 | A1 | 4/2010 | Rofougaran et al. |
| 2010/0165895 | A1 | 7/2010 | Elahi |
| 2010/0248714 | A1 | 9/2010 | Kang |
| 2010/0271987 | A1 | 10/2010 | Chiu et al. |
| 2012/0087424 | A1 | 4/2012 | Brown |
| 2012/0200158 | A1 | 8/2012 | Takei |
| 2012/0201153 | A1 | 8/2012 | Bharadia |
| 2012/0201173 | A1 | 8/2012 | Jain |
| 2012/0220246 | A1* | 8/2012 | Kushnir .................. H04B 1/04 455/118 |
| 2012/0300680 | A1 | 11/2012 | Pietsch |
| 2013/0010851 | A1 | 1/2013 | Jaeger |
| 2013/0089009 | A1 | 4/2013 | Li |
| 2013/0102254 | A1 | 4/2013 | Cyzs |
| 2013/0286903 | A1 | 10/2013 | Khojastepour |
| 2013/0301487 | A1 | 11/2013 | Khandani |
| 2014/0135056 | A1 | 5/2014 | Wang |
| 2014/0169236 | A1 | 6/2014 | Choi |
| 2014/0204808 | A1 | 7/2014 | Choi |
| 2014/0219139 | A1 | 8/2014 | Choi |
| 2015/0063176 | A1 | 3/2015 | Hong |
| 2015/0078217 | A1 | 3/2015 | Choi |
| 2015/0139284 | A1 | 5/2015 | Choi |
| 2015/0188646 | A1 | 7/2015 | Bharadia |
| 2015/0236750 | A1 | 8/2015 | Choi |
| 2015/0263780 | A1 | 9/2015 | Mehlman |
| 2015/0280893 | A1 | 10/2015 | Choi |
| 2015/0333847 | A1 | 11/2015 | Bharadia |

FOREIGN PATENT DOCUMENTS

| | | |
|---|---|---|
| KR | 1020040096404 | 11/2004 |
| KR | 1020070072629 | 7/2007 |
| KR | 1020120080231 | 7/2012 |
| WO | 9622643 | 7/1996 |
| WO | 2011065020 | 6/2002 |
| WO | 03098823 | 11/2003 |
| WO | 2010005951 | 1/2010 |
| WO | 2011148341 A1 | 12/2011 |

OTHER PUBLICATIONS

Provisional Application, entitled: "Cancellation Circuit With Variable Delay and Amplifier", U.S. Appl. No. 61/876,663, filed Sep. 11, 2013.

Provisional Application, entitled: "Feed Foward Signal Cancellation", U.S. Appl. No. 61/736,726, filed Dec. 13, 2012.

Provisional Application, entitled: "Frequency Independent Analog Cancellation Circuit", U.S. Appl. No. 61/864,459, filed Aug. 9, 2013.

Provisional Application, entitled: "Hybrid IF/RF Digital Cancellation Architectures for Full-Duplex Radios", U.S. Appl. No. 61/915,431, filed Dec. 12, 2013.

Provisional Application, entitled: "Interference Cancellation Architectures With Frequency Isolation", U.S. Appl. No. 62/030,240, filed Jul. 29, 2014.

Provisional Application, entitled: "Method and Apparatus for Mitigating Phase Noise to Improve Self-Interference Cancellation", U.S. Appl. No. 61/865,943, filed Aug. 14, 2013.

Provisional Application, entitled: "Near Band Cancellation", U.S. Appl. No. 61/970,852, filed Mar. 26, 2014.

Provisional Application, entitled: "Self Interference Cancellation Architecture for In-Band Full Duplex Relay Node", U.S. Appl. No. 61/871,519, filed Aug. 29, 2013.

Provisional Application, entitled: "Signal Cancellation Using Feedforward and Feedback", U.S. Appl. No. 61/760,518, filed Feb. 4, 2013.

Provisional Application, entitled: "Techniques for Digital Interference Cancellation", U.S. Appl. No. 62/002,578, filed May 23, 2014.

Provisional Application, entitled: "Tunable Self Interference Cancellation", U.S. Appl. No. 61/950,742, filed Mar. 10, 2014.

Provisional Application, entitled: "Tuning Algorithm for Multi-Tap Signal Cancellation Circuit", U.S. Appl. No. 61/754,447, filed Jan. 18, 2013.

Gharavol, E., et al., "Robust Joint Optimization of MIMO Two-Way Relay Channels With Imperfect CSI", Communication, Control, and Computing (Allerton), 2011 49th Annual Allerton Conference on, IEEE, Sep. 28, 2011, pp. 1657-1664, XP032085749, DOI: 10.1109/ALLERTON.2011.6120368, ISBN: 978-1-4577-1817-5.

International Search Report for PCT/US2013/040818 dated Jul. 24, 2013.

Vaze, R., et al., "To Code or Not to Code in Multi-Hop Relay Channels", arxiv.org, Cornell University Library, May 20, 2008, XP080418936, 30 pages.

EP Extended European Search Report for EP App. No. 13790076.7, dated Mar. 2, 2016, 8 pages.

Extended European Search Report for EP App. 13790948.7, dated Nov. 4, 2015, 9 pages.

International Search Report and Written Opinion for PCT/US2013/040822 dated Jul. 18, 2013.

International Search Report and Written Opinion for PCT/US2014/042136 dated Dec. 9, 2014.

(56) References Cited

OTHER PUBLICATIONS

International Search Report and Written Opinion from PCT/US2014/050968 dated Nov. 19, 2014.
Jain, M., "Practical, Real-Time, Full Duplex Wireless", MobiCom '11, Sep. 19-23, 2011, Las Vegans, NC, USA, 2011, 12 pages.
Jung Il, ., "Achieving single channel, full duplex wireless communication", Proceedings from the Annual International Conference on Mobile Computing and Networking, MOBICOM—MOBICOM' 10 and MOBIHOC' 10—Proceedings of the 16th Annual International Conference on Mobile Computing and Networking and 11th ACM International Symposi, Sep. 20, 2010, pp. 1-12, XP002696691.
Chen, B., et al., "Quantization Index Modulation: A Class of Provably Good Methods for Digital Watermarking and Information Embedding", IEEE Transaction on Information Theory, vol. 47, No. 4, May 2001, pp. 1423-1443.
EP Extended Search Report for EP App. No. 13790160.9-1874, dated Jan. 16, 2016, 9 pages.
Persson, D., et al., "Joint Source-Channel Coding for the MIMO Broadcast Channel", IEEE Transactions on Signal Processing, vol. 60, No. 4, Apr. 2012, pp. 2085-2090.
International Search Report and Written Opinion for PCT/US2014/051137 dated Nov. 24, 2014.
McMichael, J. G, et al., "Optimal tuning of analog self-interference cancellers for full-duplex wireless communication". IEEE, Fiftieth Annual Allerton Conference, Oct. 1-5, 2012, p. 246-251

\* cited by examiner

ADAPTER AND ASSOCIATED METHOD FOR FULL-DUPLEX WIRELESS COMMUNICATION

CROSS-REFERENCE TO RELATED APPLICATIONS

The present application is a non-provisional filing of, and claims benefit under 35 U.S.C. §119(e) from, U.S. Provisional Patent Application Ser. No. 61/943,632, filed Feb. 24, 2014, incorporated herein by reference; U.S. Provisional Patent Application Ser. No. 61/933,395, filed Jan. 30, 2014, incorporated herein by reference; and U.S. Provisional Patent Application Ser. No. 62/006,458, filed Jun. 2, 2014, incorporated herein by reference.

FIELD

The present disclosure relates to wireless communications. In particular, the present disclosure relates to systems and methods to establish two-way (full-duplex) wireless links.

BACKGROUND

A communication link with capability to support connections in both transmit and receive directions at the same time and over the entire frequency band is called full-duplex, or two-way. In contrast, a link that can support connection in only one direction at a time (over a given frequency band) is called one-way or half-duplex. Current wireless systems are one-way and rely on either separate time slots (time division duplex) or separate frequency bands (frequency division duplex) to transmit and to receive. These alternatives have their pros and cons, but both suffer from lack of ability to transmit and to receive concurrently over entire frequency band. Even in the context of Orthogonal Frequency Division Multiple Access (OFDMA), where different frequency tones are used to simultaneously service multiple users, there is no method known to use the OFDM tones in opposite directions. A similar shortcoming exists in the context of Code Division Multiple Access (CDMA). Although full-duplex wireless is theoretically possible, its implementation is difficult due to an excessive amount of interference caused by a transmitter to its own receiver(s).

Full-duplex communication is currently used in many applications, e.g., wired telephones, digital subscriber line, wireless with directional antennas, and free-space optics. The impact of full-duplex links in these earlier applications is limited to doubling the communications rate by providing two symmetrical pipes of data flowing in opposite directions. In contrast, in multi-user wireless systems, due to the broadcast nature of transmission (everyone hears everyone else), full-duplex capability has the potential to do more than merely double the communications rate. A summary of some of the benefits of full-duplex is as follows.

Full-duplex facilitates wireless networking In particular, the ability to handle asynchronous users enables superimposing a half-duplex, low bit rate, low power, easy to detect network for control signaling superimposed (physical overlay, rather than logical) on top of the network of primary full-duplex data links The superimposed links are separated from the primary full-duplex data links in the code domain, and use time multiplexing plus Carrier Sense Multiple Access (CSMA) among themselves. However, the conventional problems of CSMA are avoided as control links operate in parallel with primary full-duplex data links. The physical layer of control links is designed such that full-duplex data links can detect and cancel the interference caused by the superimposed control links.

Full-duplex enhances security through desirable jamming.

Full-duplex facilitates multi-node distributed & collaborative signaling, including realization of Network Information Theoretic setups, and cognitive wireless.

Full-duplex, through exploiting feedback, improves point-to-point throughput, and enables ultra-low power transmission.

Full-duplex doubles the point-to-point throughput.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION OF THE INVENTION

The present disclosure describes systems for adapting transceivers for full-duplex wireless communication and method associated therewith.

Figure 1:
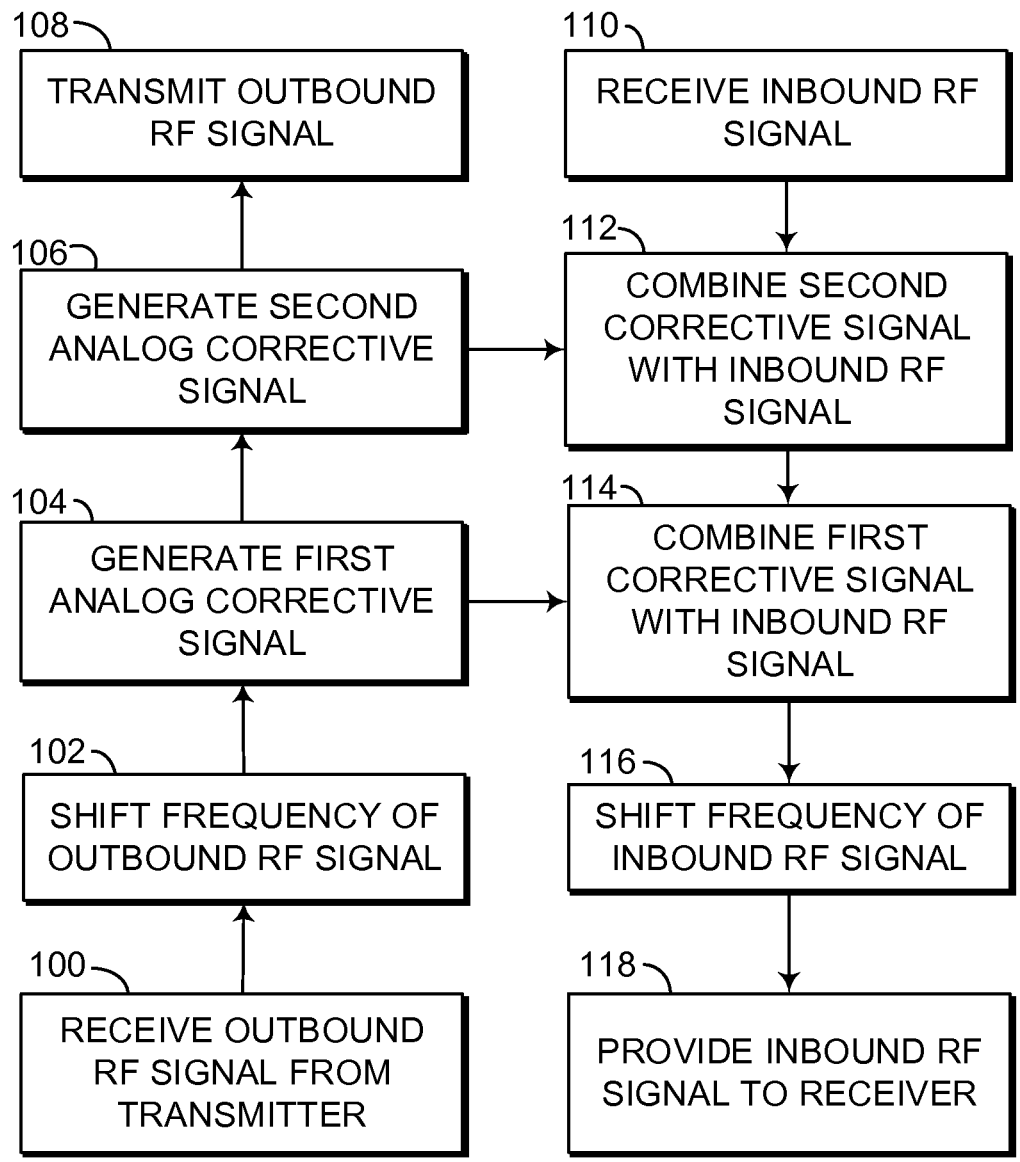
FIG. 1 is a flow chart illustrating an exemplary method of adapting a transceiver for use in full-duplex communications.

FIG. 1 is a flow chart illustrating an exemplary method of adapting a half-duplex transceiver for use in wireless full-duplex communications. In step 100, a full-duplex adapter receives an outbound radio-frequency (RF) signal from a first transceiver at a first frequency. The signal may be received over a radio-frequency coupler. In step 102, the adapter shifts the frequency of the outbound radio-frequency signal to a second radio frequency different from the first radio frequency. In step 104, the adapter generates a first radio-frequency analog corrective signal from the outbound radio-frequency signal, and in step 106, the adapter generates a second radio-frequency corrective signal from the outbound radio-frequency signal. The generation of radio-frequency corrective signals will be described in greater detail below. The outbound radio-frequency signal is transmitted in step 108 using, for example, a transmit antenna of the adapter.

In step 110, the adapter receives an inbound radio-frequency signal over a receive antenna. This first inbound radio-frequency signal includes a self-interference component caused by the radio-frequency transmission of step 108 and further includes a desired radio-frequency component, such as a radio frequency transmission from a distant transmitter. In full-duplex communications, the radio-frequency signal transmitted by the adapter in step 108 has the same frequency as the desired radio-frequency component of the inbound radio-frequency signal. As a result, the self-interference component cannot be removed by simple frequency filtering without also removing the desired radio-frequency component. However, as disclosed herein, the self-interference component can be canceled, at least in part, with the use of the analog corrective signals.

Specifically, in step 112, the second corrective signal is combined with the incoming radio-frequency signal to reduce the self-interference component of the inbound radio-frequency signal. In step 114, the first corrective signal is also combined with the incoming radio-frequency signal to further reduce the self-interference component of the inbound radio-frequency signal. In step 116, the adapter shifts the frequency of the inbound radio-frequency signal, and in step 118, the inbound radio-frequency signal is provided to the transceiver through, for example, a radio-frequency coupler.

While the transmitted radio-frequency signal and the desired radio-frequency component have the same frequency, the outbound radio-frequency signal received from the transceiver in step 100 has a frequency different from the inbound radio frequency signal sent to the transceiver in step 118. Thus, the method illustrated in FIG. 1 can be employed, with the use of an adapter as described herein, with a conventional half-duplex transceiver that requires different radio frequencies for transmitted and received signals.

In the exemplary embodiment of FIG. 1, steps are illustrated of shifting the frequency of both the outbound radio-frequency signal (step 102) and the inbound radio-frequency signal (step 116). In some embodiments, only the frequency of the outbound radio-frequency signal is shifted, while in other embodiments, only the frequency of the inbound radio-frequency signal is shifted.

Figure 2:
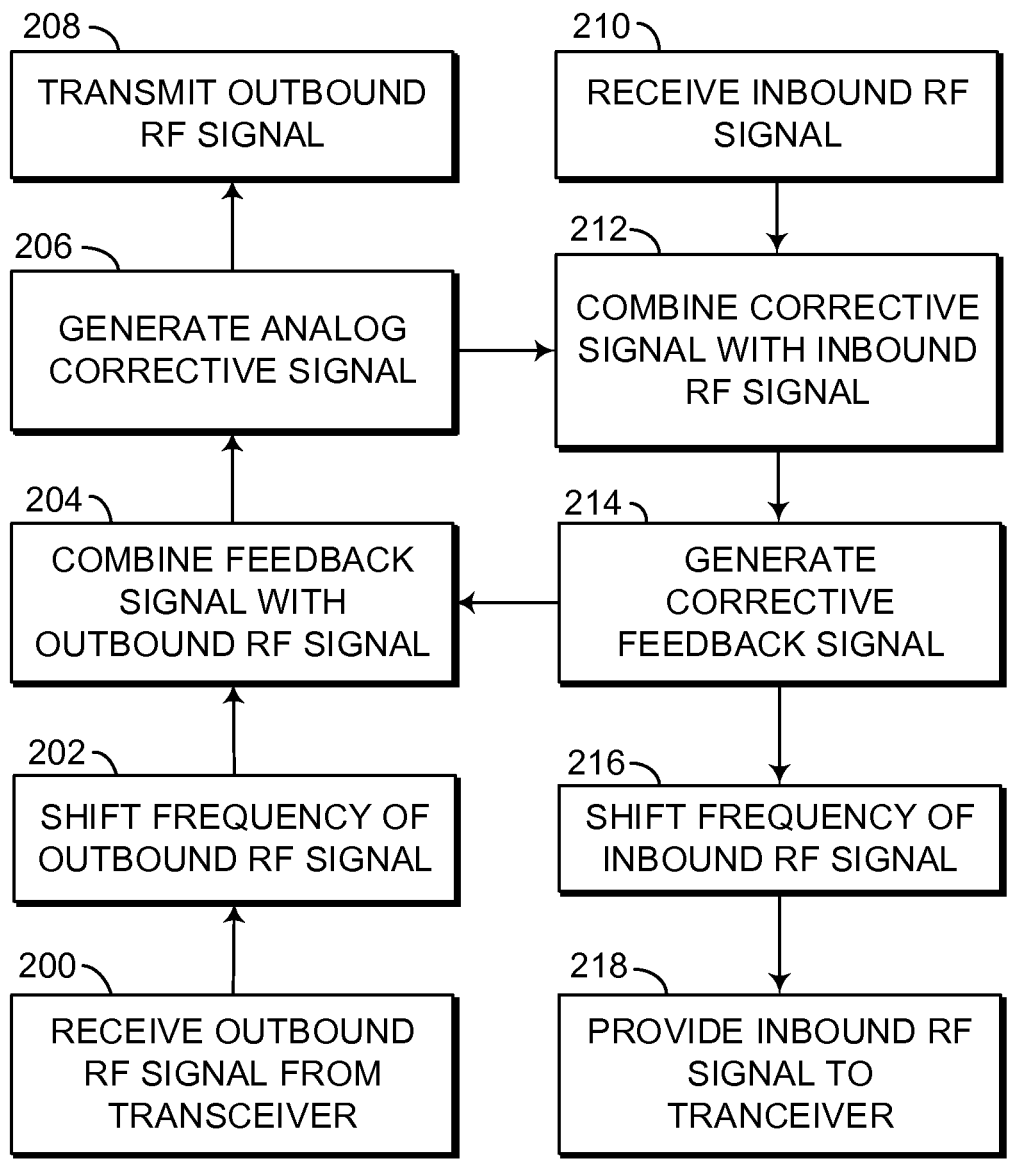
FIG. 2 is a flow chart illustrating another exemplary method of adapting a transceiver for use in full-duplex communications.

FIG. 1 illustrates the use of two radio-frequency analog corrective signals. However, in some embodiments, only one radio-frequency analog corrective signal may be used. One such embodiment making use of a single radio-frequency corrective signal is illustrated in FIG. 2. In step 200, the adapter receives an outbound radio-frequency signal from a transceiver. In step 202, the adapter shifts the frequency of the outbound radio-frequency signal to a different radio frequency. In step 204, the frequency-shifted outbound radio-frequency signal is combined with a feedback signal described in greater detail below. In step 206, a radio-frequency analog corrective signal is generated from the outbound radio-frequency signal, and in step 208, the outbound radio-frequency signal is transmitted, for example by a transmit antenna.

In step 210, the adapter receives an inbound radio-frequency signal, for example using a receive antenna. This inbound radio-frequency signal includes a desired radio-frequency component. In wireless full-duplex operation, this desired radio-frequency component has the same frequency as the transmitted outbound radio-frequency signal. The inbound radio-frequency signal further includes a self-interference component caused by the transmission of the outbound radio-frequency signal. To cancel out at least a portion of the self-interference component, the adapter in step 212 combines the corrective signal with the inbound radio-frequency signal.

While the use of the radio-frequency corrective signal in step 212 can cancel a substantial portion of the self-interference component, it is likely that some amount of self-interference remains in the inbound radio-frequency signal. To help further reduce the self-interference component, the adapter in step 214 generates a corrective feedback signal from the inbound radio-frequency signal, and as noted above, that corrective feedback signal is combined (in step 204) with the outbound radio-frequency signal.

In step 216, the adapter shifts the frequency of the inbound radio-frequency signal, and in step 218, the inbound radio-frequency transceiver is provided to the transceiver through, for example, a radio-frequency coupler.

In the exemplary embodiment of FIG. 2, steps are illustrated of shifting the frequency of both the outbound radio-frequency signal (step 202) and the inbound radio-frequency signal (step 216). In some embodiments, only the frequency of the outbound radio-frequency signal is shifted, while in other embodiments, only the frequency of the inbound radio-frequency signal is shifted. The frequency-shifting steps are performed as needed to accommodate use of the adapter with a conventional half-duplex transceiver that requires different radio frequencies for transmitted and received signals. In this way, the transmitted radio-frequency signal and the desired radio-frequency component have the same frequency, but the outbound radio-frequency signal received from the transceiver in step 200 has a frequency different from the inbound radio frequency signal sent to the transceiver in step 218.

In a variation on the embodiment disclosed in FIG. 2, the corrective feedback signal can be generated by sampling the analog corrective signal itself, by adjusting the amplitude and phase of the sampled first analog corrective signal to generate a corrective feedback signal, and by combining the corrective feedback signal with the sampled outbound radio-frequency signal.

While the embodiment of FIG. 2 illustrates the use of a single radio-frequency corrective signal along with a feedback signal, it should be noted that in other embodiments, a single radio-frequency corrective signal may be employed without the use of a feedback signal.

Figure 3:
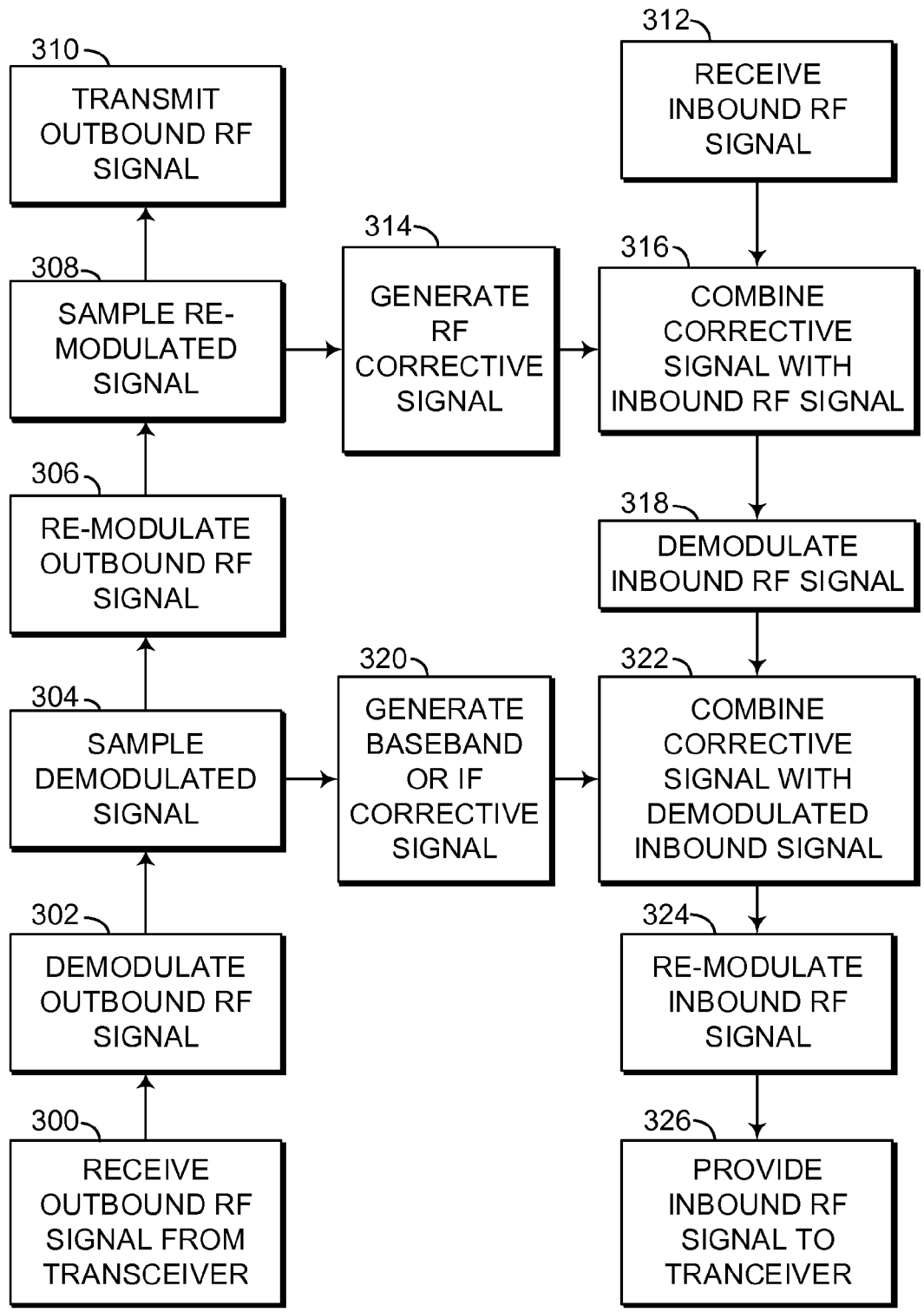
FIG. 3 is a flow chart illustrating another exemplary method of adapting a transceiver for use in full-duplex communications.

As illustrated in FIG. 3, a baseband and/or intermediate frequency (IF) analog corrective signal may be used in addition to the radio-frequency analog corrective signal. FIG. 3 also illustrates an exemplary technique of frequency shifting, specifically by demodulating a radio-frequency signal and then re-modulating it at a different radio frequency. In step 300, a full-duplex adapter receives an outbound radio-frequency signal from a transceiver over, for example, a radio-frequency coupler. In step 302, the adapter demodulates the received outbound radio-frequency signal to generate a demodulated outbound signal. The demodulated outbound signal may be at a baseband frequency or at an intermediate frequency. In step 304, the adapter samples the demodulated outbound signal using, for example, an operational-amplifier-based signal splitter, to generate a sampled demodulated outbound signal.

In step 306, the adapter modulates the demodulated outbound signal. The re-modulation may be performed at a radio frequency different from the frequency of the received outbound radio-frequency signal. In step 308, the adapter samples the re-modulated outbound radio-frequency signal as a part of the process, described in further detail below, of generating a radio-frequency corrective signal. In step 310, the adapter transmits the re-modulated outbound radio-frequency signal using a transmit antenna.

In step 312, the adapter receives an inbound radio-frequency signal that includes a radio-frequency self-interference component and a desired radio frequency component. The desired radio-frequency component is at the same frequency as the outbound radio frequency signal transmitted in step 310. To help cancel the self-interference component, a radio-frequency analog corrective signal is generated in step 314. In some embodiments, the analog radio-frequency corrective signal is generated by adjusting the phase and amplitude of the sampled outbound radio-frequency signal. In step 316, the radio-frequency corrective signal is combined with the inbound radio-frequency signal to cancel at least a portion of the self-interference component.

In step 318, the adapter demodulates the inbound radio-frequency signal with reduced self-interference to generate a demodulated inbound radio-frequency signal. The demodulated inbound radio-frequency signal may be a baseband frequency signal or an intermediate-frequency signal. The demodulated inbound radio-frequency signal may include a demodulated self-interference component. In step 320, the adapter generates a baseband or intermediate-frequency analog corrective signal. This second corrective signal may be generated by applying a predetermined transformation to the demodulated signal sampled in step 304. The predetermined transformation may take one or more of several different forms. For example, the sampled demodulated signal may be converted using fast-Fourier transform (FFT) circuitry to the frequency domain, and the predetermined transformation may be implemented by applying a linear transfer function to the corrective signal in the frequency domain. An inverse-FFT may be applied to bring the signal back into the time domain. Alternatively, the predetermined transformation may be implemented without the use of FFT circuitry by, for example, applying one or more filters, such as equalizing filters, to the sampled signal. Nonlinear transformations such as a Taylor series or a Volterra series may also be used to generate a baseband and/or intermediate-frequency corrective signal from the sampled demodulated outbound signal. In step 322, the combining the baseband or intermediate-frequency analog corrective signal is combined with the demodulated inbound signal to reduce the demodulated self-interference component.

In step 324, the demodulated inbound radio-frequency signal is re-modulated. The re-modulation in step 324 may be at a different frequency from the frequency of the desired component of the incoming radio-frequency signal. In step 326, the inbound radio-frequency signal is provided to the transceiver, for example through a radio-frequency coupler.

As noted above with respect to FIGS. 1 and 2, the frequency of at least one (and possibly both) of the inbound and the outbound radio-frequency signals is shifted through the demodulation and subsequent re-modulation of the signal. The frequency shifting is performed such that the outbound radio-frequency signal transmitted in step 310 has the same frequency as the desired radio-frequency component received in step 312. This allows more efficient use of the radio-frequency spectrum, because the simultaneous transmission and receipt of radio-frequency occur at the same frequency. At the same time, the outbound signal received from the transceiver in step 300 and the inbound signal provided to the transceiver in step 326 have different radio frequencies, allowing the full-duplex adapter to interface with a conventional half-duplex transceiver.

Figure 4:
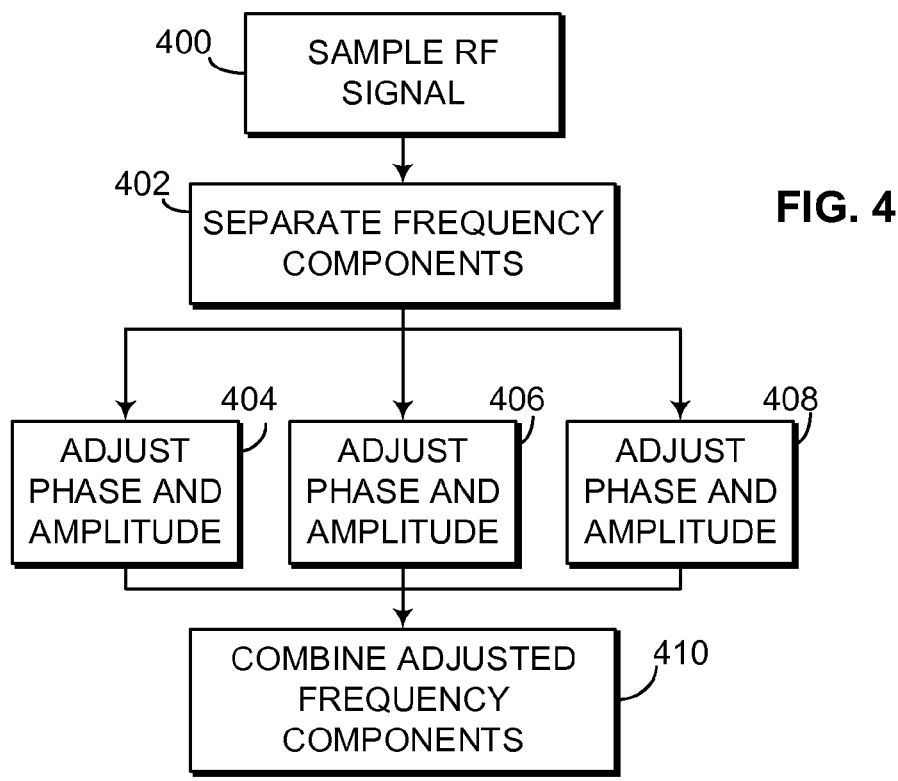
FIG. 4 is a flow chart illustrating an exemplary method of tuning a cancellation signal using phase and amplitude adjustments.

FIG. 4 illustrates an exemplary method for the generation of a radio-frequency corrective signal as may be performed in, for example, steps 104, 106, 206, and 314 of FIGS. 1-3. In step 400, the adapter samples the outbound radio-frequency signal using, for example, a directional radio-frequency coupler. In step 402, the adapter separates the sampled outbound radio-frequency signal into a plurality of frequency-dependent corrective signal components. While the use of three such components is illustrated in FIG. 4, a greater or lesser number of components may be used. Each of the frequency-dependent components may contain signals from a different portion of the frequency spectrum encompassed by the sampled outbound radio-frequency signal. In steps 404, 406, and 408, the amplitudes and phases of the frequency-dependent corrective signal components are separately adjusted, for example by concatenating a tunable phase circuit with a tunable gain circuit, allowing different adjustments to be applied to different frequency-dependent corrective signal components. Various exemplary techniques for separating a signal into frequency-dependent corrective signal components and for adjusting the phase and amplitude of those components are described in greater detail below. In step 410, the adjusted frequency-dependent corrective-signal components are combined to generate the analog corrective signal.

Figure 5:
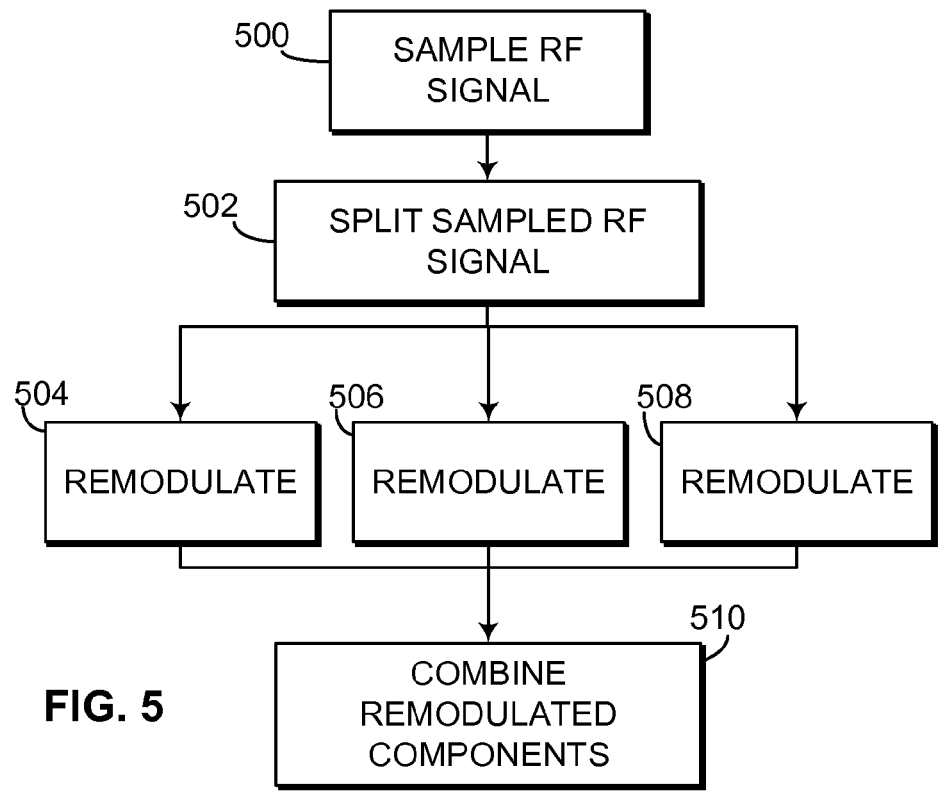
FIG. 5 is a flow chart illustrating an exemplary method of tuning a cancellation signal using remodulation.

Another method for generating an analog radio-frequency corrective signal is illustrated in FIG. 5. In step 500, the outbound radio-frequency signal is sampled, and in step 502, the sampled outbound radio-frequency signal is split into a plurality of corrective path signals. Each of the frequency-dependent components may contain signals from a different portion of the frequency spectrum encompassed by the sampled outbound radio-frequency signal. These corrective path signals may be different frequency-dependent corrective signal components, or they may be identical replicas of the sampled outbound radio-frequency signal. In steps 504, 506, and 508, the adapter remodulates the sampled RF signals. Remodulators in steps 504, 506, 508 operate using an RF modulator wherein the sampled RF signal excites the carrier input of the modulator and the I/Q inputs of the modulator are adjusted to tune the phase and the magnitude of the remodulated output RF signal, as described in further detail below with respect to FIG. 11. In step 510, the remodulated corrective path signals are combined to form the analog corrective signal.

Figure 6:
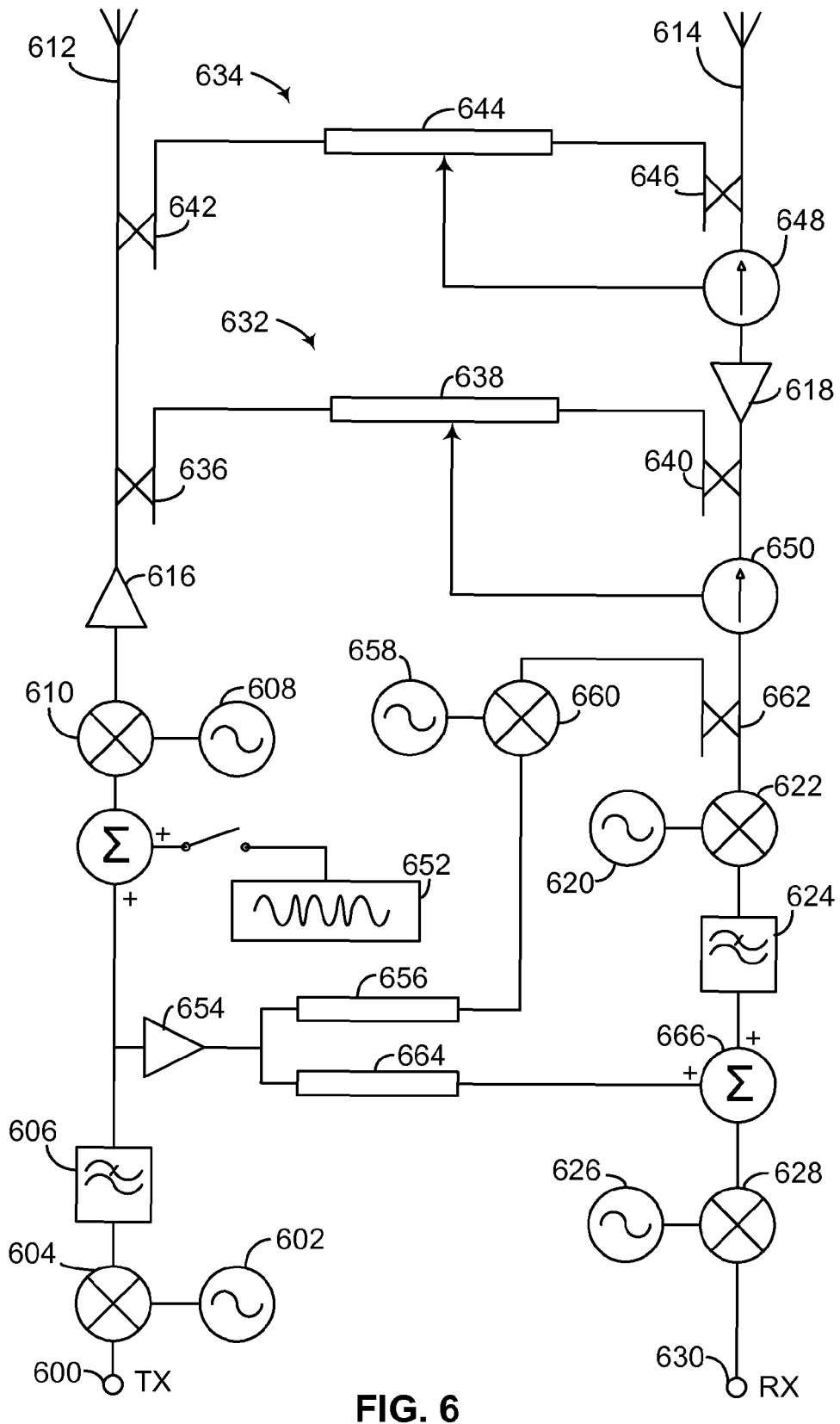
FIG. 6 is a schematic signal processing diagram illustrating an exemplary full-duplex transceiver adapter.

An exemplary full-duplex adapter is illustrated in FIG. 6. The adapter is provided with an outbound radio-frequency connection node 600 that is operative to receive a first outbound radio-frequency signal from a transceiver, such as a conventional half-duplex transceiver. The outbound radio-frequency connection node 600 may be a radio-frequency coupler. The adapter further includes an outbound radio-frequency demodulator, which may be implemented a local oscillator 602, a mixer 604, and a low-pass filter 606. The outbound radio-frequency demodulator is operative to demodulate the first outbound radio frequency signal to generate a demodulated outbound signal.

The adapter is also provided with an outbound radio-frequency modulator operative to generate a second outbound radio-frequency signal. The outbound radio-frequency modulator can be implemented with a local oscillator 608 and mixer 610. The local oscillators 602 and 608 along the transmit path may operate at the same frequency, in which case the frequency of the outbound radio-frequency signal remains unchanged through the demodulation and re-modulation process. Alternatively, the frequencies of the local oscillators 602 and 608 may differ from one another, in which case the frequency of the outbound radio-frequency signal is shifted as a result of the demodulation and re-modulation process.

In the example of FIG. 6, the adapter is provided with a transmit antenna 612 and a receive antenna 614. Preferably, the geometries and relative orientations of the transmit antenna 612 and the receive antenna 614 are selected to minimize radio-frequency coupling between the two antennas. For example, the transmit antenna 612 and the receive antenna 614 may be arranged in a pairwise symmetric configuration. The transmit antenna 612 is connected to the output of the outbound radio-frequency modulator through a power amplifier 616.

The receive antenna 614 is operative to receive a first inbound radio-frequency signal. The first inbound radio frequency signal is amplified by a low-noise amplifier (LNA) 618 and provided to an inbound radio-frequency demodulator. The inbound radio-frequency demodulator may be implemented with a local oscillator 620, a mixer 622, and a low-pass filter 624. The inbound radio-frequency demodulator is operative to demodulate the first inbound radio frequency signal to generate a demodulated inbound signal. In full-duplex communications, the first inbound radio-frequency signal has the same frequency as the second outbound radio-frequency signal transmitted by the transmit antenna 612. Thus, the local oscillator 620 of the inbound radio-frequency demodulator operates at the same frequency as the local oscillator 608 of the outbound radio-frequency modulator. In some embodiments, the inbound radio-frequency demodulator and the outbound radio-frequency modulator use the same local oscillator. In such embodiments, local oscillators 608 and 620 would be replaced by a single local oscillator.

It is useful in some embodiments to provide a buffer between first and second stages of a self-interference cancellation. In the example of FIG. 6, the buffering is provided by the low-noise amplifier 618, though other types of buffering may be employed in other embodiments. The use of a buffer allows the second cancellation stage to operate independent of the first stage, and provide enough gain for its operation. Additional buffers may be provided between additional cancellation stages to provide a desired level of isolation and signal amplitude. In some embodiments, a buffer such as low-noise amplifier 618 is turned on only after the first cancellation stage (e.g., the stage including the tuning component 644) has been tuned.

The adapter is provided with an inbound radio-frequency modulator, which may be implemented by a local oscillator 626 and a mixer 628. The inbound radio-frequency modulator is operative to modulate the demodulated inbound signal to generate a second inbound radio-frequency signal. The adapter further includes an inbound radio-frequency connection node 630 connected to an output of the inbound radio-frequency modulator. The inbound radio-frequency connection node 630 permits connection with a conventional half-duplex transceiver. The inbound radio-frequency connection node 630 may include a radio-frequency coupler.

A conventional half-duplex transceiver used with the adapter typically requires transmitted and received signals to be at different frequencies. As a result, the frequency of the first outbound radio-frequency signal provided at the outbound radio-frequency connection node 600 is different from the frequency of the second inbound radio-frequency signal provided at the inbound radio-frequency connection node 630. To accomplish this, the frequency of the local oscillator 602 is different from the frequency of the local oscillator 626.

In embodiments in which it is not necessary to shift the frequency of the outbound radio-frequency signal, the oscillators 602 and 608 may operate at the same frequency, or they may be replaced by a single oscillator. Similarly, in embodiments in which it is not necessary to shift the frequency of the inbound radio-frequency signal, the oscillators 620 and 626 may operate at the same frequency, or they may be replaced by a single oscillator. In some embodiments, oscillators 602, 608, and 620 may be replaced by a single oscillator, with oscillator 626 operating at a different frequency. In other embodiments, oscillators 608, 620, and 626 may be replaced by a single oscillator, with oscillator 602 operating at a different frequency. Other such variations will also be apparent to those of ordinary skill in the art.

As is further illustrated in FIG. 6, circuitry may also be provided for cancelling self-interference caused by transmissions from the transmit antenna 612. As noted above, transmit antenna 612 and 614 are preferably oriented so as to minimize self-interference, but some residual coupling between those antennas is likely to remain. The embodiment of FIG. 6 includes a first radio-frequency cancellation path 632 and a second radio-frequency cancellation path 634. These cancellation paths are connected between the output of the outbound radio-frequency modulator and the input of the inbound radio-frequency demodulator.

The first radio-frequency cancellation path 632 includes a radio-frequency coupler 636. The coupler 636 is operative to sample the second outbound radio-frequency signal to generate a first sample signal. The cancellation path 632 further includes a tuning component 638, operative to adjust the phase and amplitude of the first sample signal to generate a first cancellation signal. The structures of possible tuning components are described in further detail below. Another radio-frequency coupler 640 operates to combine the first cancellation signal with the first inbound radio-frequency signal.

The second radio-frequency cancellation path 634 includes a radio-frequency coupler 642. The coupler 642 is operative to sample the second outbound radio-frequency signal to generate a second sample signal. The cancellation path 634 further includes a tuning component 644, operative to adjust the phase and amplitude of the second sample signal to generate a second cancellation signal. The structures of possible tuning components are described in further detail below. Another radio-frequency coupler 646 operates to combine the second cancellation signal with the first inbound radio-frequency signal.

In the embodiment of FIG. 6, the tuning properties of the tuning components 638, 644 can be modified to improve self-interference cancellation. A first received signal strength indicator (RSSI) 648 and a second RSSI 650 are provided at different points along the receive path. In a method of modifying the tuning properties of the tuning components 638 and 644, the amount of amplitude adjustment (gain or attenuation) and phase shift introduced by tuning component 644 are first adjusted while the signal strength at RSSI 648 is monitored. The tuning properties of component 644 are selected to minimize the signal strength at RSSI 648. This selection may be performed by testing a plurality of candidate sets of properties (gain and phase shift properties) of the component 644 to identify the selection that results in the lowest signal strength at RSSI 648, or it may be performed using a steepest-descent or bi-section algorithm to adjust the tuning properties to minimize the signal strength. Once the tuning properties are selected for tuning component 644, those properties are held constant while a similar selection process is undertaken to adjust the properties of tuning component 638 to minimize the signal strength measured at RSSI 650.

In some embodiments, the process of selecting signal the tuning properties for the tuning components 638 and 644 may involve the use of a test signal. As illustrated in FIG. 6, a test signal generator 652 is provided to generate a test signal that is modulated and transmitted from transmit antenna 612. The RSSIs 648 and 650 measure the strength of the self-interference signal caused by the test signal, and the properties of tuning components 638 and 644 are modified to minimize the self-interference signal strength.

The adapter may enter into a training mode periodically, e.g. every 20 msec. Upon the start of the 20 msec, the adapter may complete any communication currently underway and then employ a periodic training sequence formed in the frequency domain, then converted into the time domain. In another example, to avoid an interruption in the transmission to the distant node, the training sequence can be multiplied by a signature pseudo-random binary sequence and superimposed on the signal aimed at the distant receiver. The signatures are such that each adapter can extract its own training sequence for self-interference cancellation from the combined transmitted signal.

The adapter of FIG. 6 includes additional cancellation paths. A buffer 654 samples the demodulated outbound signal. A tuning component 656 adjusts the phase and amplitude of the sampled demodulated outbound signal, and the adjusted sampled demodulated signal is re-modulated with a local oscillator 658 and mixer 660 to form another analog radio-frequency cancellation signal. This analog radio-frequency cancellation signal is combined with the first inbound radio-frequency signal by a radio-frequency coupler 662.

One of the cancellation paths in the embodiment of FIG. 6 is a baseband cancellation path connected between the output of the outbound radio-frequency demodulator and the input of the inbound radio-frequency modulator. On the baseband cancellation path, a tuning component 664 acts as a filter and adjusts the frequency characteristics of the sampled demodulated outbound signal to generate an analog corrective signal that is combined by a summing circuit 666 with the demodulated inbound signal. The tuning components 656 and 664 may operate in the time domain, or they may, for example, convert the sampled demodulated outbound signal to the frequency domain for application of a transfer function. The transfer function may replicate a transfer function describing the characteristics of the remaining self-interference after RF cancellations through 632 and 632.

The training of tuning components in the embodiment of FIG. 6 is preferably performed in a nested fashion. That is, each tuning component is adjusted in the order in which its associated cancellation signal is applied to an inbound radio-frequency signal. In the example of FIG. 6, the first tuning component to be adjusted is component 644, followed by 638, 656, and then 664. This simplifies the measurement and improves the accuracy by enabling each stage to measure the residue left from its earlier stages. To further simplify the tuning operation, each tuning component may have a discrete state space indexed by s=1, . . . ,S. Then, in a long-term (i.e., done infrequently) training phase, to capture the structure of tunable filters, each state of the filter bank is measured at the receive baseband and stored in terms of its difference with respect to a reference state. These complex vectors are called signatures of the filter states. Following this phase, in a short-term (i.e., done frequently) training phase, to capture the structure of the self-interference channel and select the proper filter state for better self-interference cancellation, first the reference state is selected, the resulting channel of self-interference is measured at the base-band, and then the filter state for which the signature vector is closest to the negative of the measured self-interference channel is selected to be used for self-interference cancellation. In another embodiment, filter signature vectors as well as the vector of self-interference channel are normalized in terms of magnitude, and attenuation in the filter bank is selected independent of the state of the energy storage units.

As described above, tuning components, such as components 638, 644, which perform steps such as steps 404, 406, 408 of adjusting amplitude and phase, can be implemented using a variety of different types of circuits. In some embodiments, tuning components are nested, such that one tuning component itself includes a plurality of simpler tuning components, each of which acts on a different component of a cancellation signal (e.g., on a different frequency component).

Figure 7:
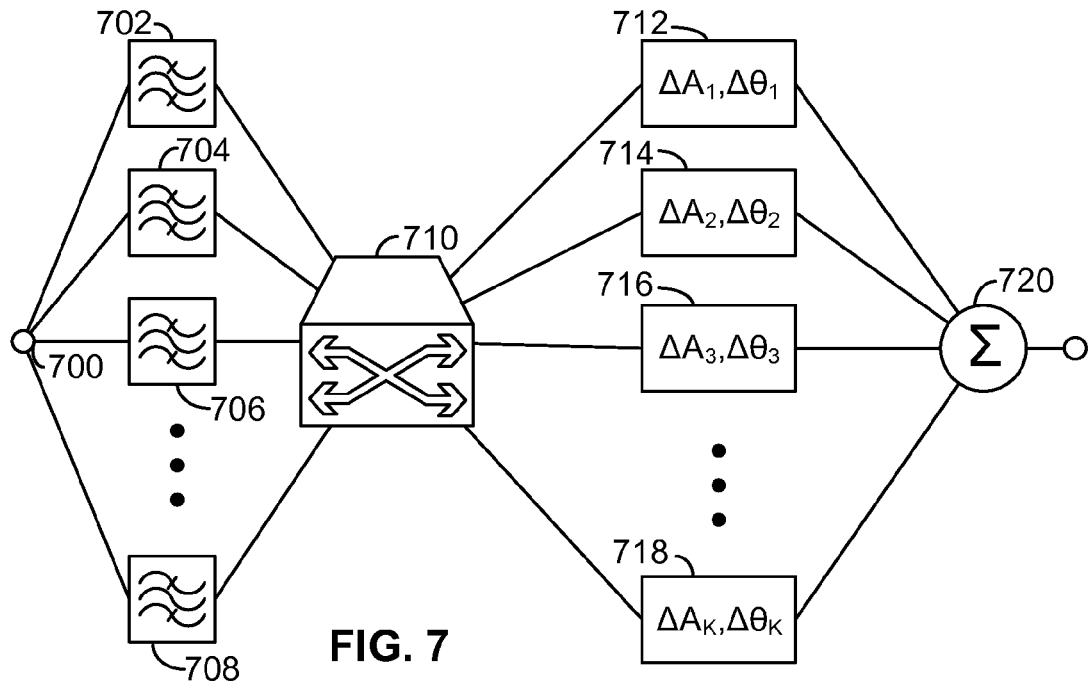
FIG. 7 is a functional block diagram illustrating an exemplary tuning component of a full-duplex transceiver adapter using an analog crossbar switch.

FIG. 7 illustrates one such embodiment of a tuning component. A cancellation signal provided at node 700 is split into several cancellation signal components and is provided to a plurality of frequency-selective filters 702, 704, 706, 708. There may be different numbers of such filters in different embodiments. In the embodiment of FIG. 7, there are M such filters. The frequency-selective filters may be bandpass filters. Each of these filters provides a frequency-filtered signal to an M×K analog crosspoint switch 710. The crosspoint switch 710 selectively connects one or more of the M different frequency-selective filters with one or more of K different tuning components 712, 714, 716, and 718, with different tuning properties. The tuning components 712, 714, 716, and 718 may, include, for example, known methods of adjusting phase and amplitude, such as amplifier circuits with differing values of gain or attenuation, and phase-shifting circuits with capacitive and/or inductive components, or the tuning components may take the form of one of the exemplary tuning components described below. The tuning components selected by the crosspoint switch 710 operate to separately adjust the amplitude and phase of the respective frequency-dependent corrective-signal component. A signal adder 720 is provide for combining the adjusted frequency-dependent corrective-signal components to generate an analog corrective signal.

Figure 8:
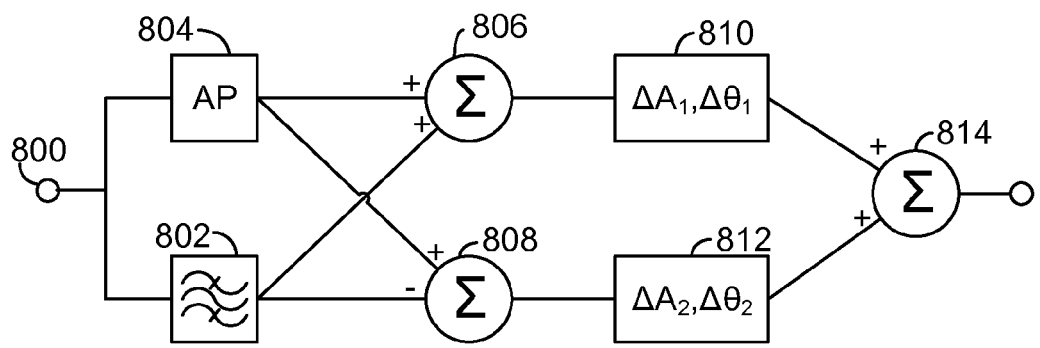
FIGS. 8-14 are functional block diagrams illustrating alternative exemplary tuning components of a full-duplex transceiver adapter.

Another exemplary tuning component is illustrated in FIG. 8. A radio-frequency coupler, such as coupler 636 (FIG. 6), provides a sample signal to node 800. The sample signal is provided to a frequency-selective filter 802 and to an all-pass filter 804. The all-pass filter 804 may be implemented by, for example, a transmission line with low phase dispersion and a short delay, with characteristics selected such that the phase and amplitude of the output of the all-pass filter 804 substantially match the phase and amplitude at an edge of the pass band of the frequency-selective filter. Preferably, the frequency-selective filter 802 has a small and relatively constant level of attenuation across the pass band, and the filter 802 preferably introduces a frequency-dependent phase shift across the pass band, such that there is a 180° (π radians) phase difference between the high-frequency and low-frequency ends of the pass band.

The frequency-selective filter 802 generates a filtered signal that is provided to a first adder 806, where it is added to the sample signal to generate a frequency-dependent corrective signal referred to herein as a sum signal. The filtered signal and the sample signal are also provided to a subtractor 808. The subtractor 808 generates another frequency-dependent corrective signal that represents a difference between the sample signal and the filtered signal, referred to herein as a difference signal. A first tuning component 810 operates to tune the amplitude and phase of the sum signal to generate a tuned sum signal. A second tuning component 812 operates to tune the amplitude and phase of the difference signal to generate a tuned difference signal. A second adder 814 then combines the tuned sum signal and the tuned difference signal to generate a cancellation signal.

The tuning component of FIG. 8 operates by a process analogous to the Hadamard transform. Representing the sample signal (after passage through the all-pass filter) with the notation AP, and representing the frequency-selected signal with the notation FS, the sum signal is represented by AP+FS, while the difference signal is represented by AP-FS. This construction is analogous to the rows of a 2×2 Hadamard matrix, namely (1 1) and (1 −1). If it were not for the tuning performed by the tuning components 810, 812, the summing of the sum signal and the difference signal would result in AP+FS+AP−FS, which is equal to 2AP. However, tuning of the frequency-selected filtered signal components permits fine adjustments to be made to more closely match the cancellation signal to the self-interference whose cancellation is desired.

Figure 9:
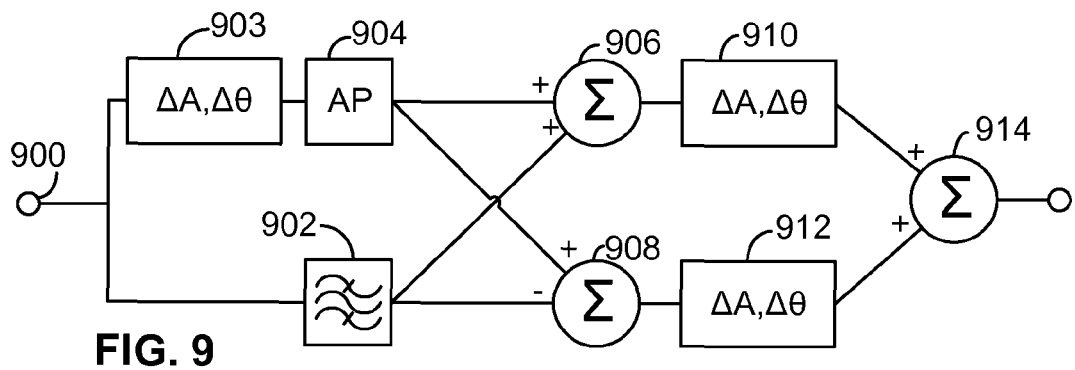

The tuning component of FIG. 9 represents a variation of the component of FIG. 8. A radio-frequency coupler, such as coupler 636 (FIG. 6), provides a sample signal to node 900. The sample signal is provided to a frequency-selective filter 902 and to an all-pass filter 904. However, before the sample signal reaches the all-pass filter 904, it passes through a tuning component 903. The frequency-selective filter 902 generates a filtered signal that is provided to a first adder 906, where it is added to the tuned sample signal to generate a sum signal. The filtered signal and the tuned sample signal are also provided to a subtractor 908. The subtractor 908 generates a difference signal that represents a difference between the tuned sample signal and the filtered signal. A first tuning component 910 operates to tune the sum signal to generate a tuned sum signal. A second tuning component 912 operates to tune the difference signal to generate a tuned difference signal. A second adder 914 then combines the tuned sum signal and tuned difference signal to generate a cancellation signal.

Figure 10:
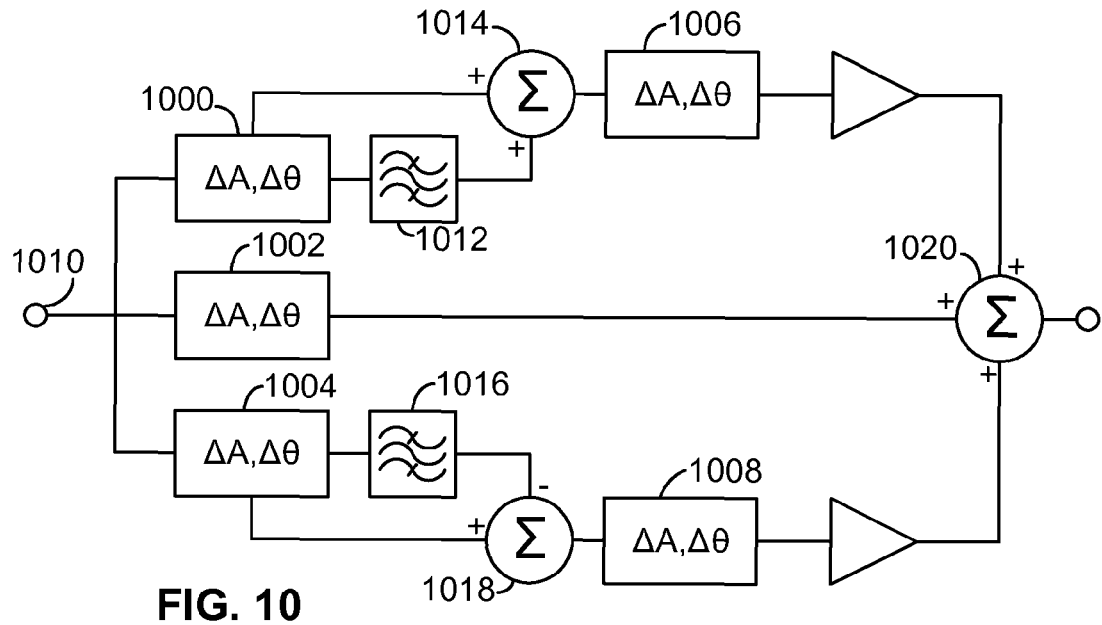

Another tuning component is illustrated in FIG. 10. Like the tuning components of FIGS. 7-9, the component of FIG. 10 is a composite tuning component that itself includes an arrangement of simpler tuning components. The simpler tuning components may themselves be composite components, or they may be known tuning components such as amplifiers with fixed or adjustable gain and/or capacitive or inductive circuits with predetermined and/or adjustable phase shifts. The composite tuning component of FIG. 10 includes a plurality of simpler tuning components 1000, 1002, 1004, 1006, and 1008. A sample signal, such as a sample of an outbound radio-frequency signal, is provided at node 1010. The sample signal is provided to three different tuning components 1000, 1002, and 1004. The tuning component 1000 has two outputs, one of which is passed through a frequency-selective filter 1012 to generate a filtered signal. This filtered signal is combined by an adder 1014 with the unfiltered output of tuning component 1000 to generate a sum signal. This sum signal is then passed through tuning component 1006 to generate a tuned sum signal.

The tuning component 1004 also has two outputs, one of which is passed through a frequency-selective filter 1016 to generate a filtered signal. This filtered signal is combined by a subtractor 1018 with the unfiltered output of tuning component 1004 to generate a difference signal. This difference signal is then passed through tuning component 1008 to generate a tuned difference signal. An adder 1020 combines the tuned sum signal, the tuned difference signal, and the tuned output of tuning component 1002 to generate a cancellation signal.

Figure 11:
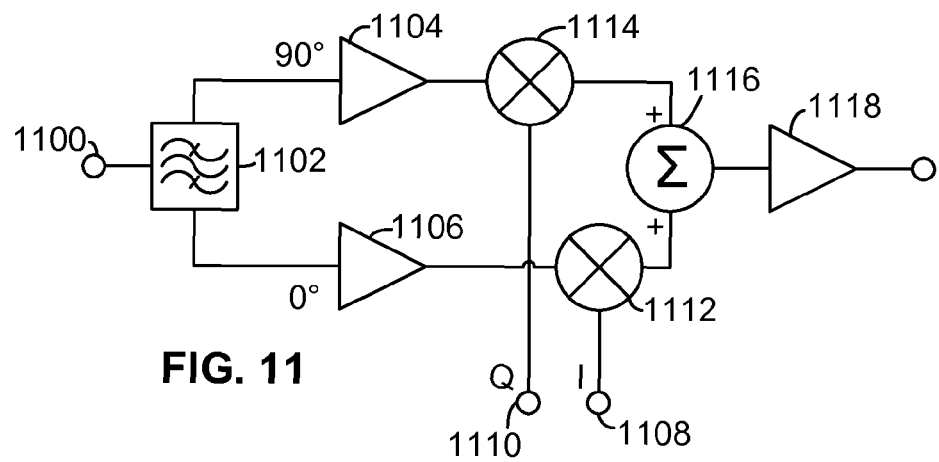

While the foregoing exemplary tuning circuits of FIGS. 7-10 are composite tuning components, the exemplary tuning circuit of FIG. 11 is a simple tuning component that can be used either on its own or as a component of a composite tuning component. A sample signal provided at node 1100 is split by a hybrid splitter 1102 into two signals that differ from each other by a 90° phase difference. The hybrid splitter 1102 may operate by, for example splitting the sample signal in two and then routing one of the two signals through a delay line one quarter wavelength in length. The two signals are referred to herein as the in-phase sample signal and the quadrature sample signal. The hybrid splitter is isolated from subsequent componentry by buffers 1104, 1106 or by other radio-frequency isolation circuitry.

The tuning component is provided with an in-phase control input 1108 and a quadrature control input 1110. A first multiplier 1112 multiplies the in-phase sample signal by the in-phase control input 1108 to generate a weighted in-phase signal, and a second multiplier 1114 multiplies the quadrature sample signal by the quadrature control input 1110 to generate a weighted quadrature signal. An adder 1116 combines the weighted in-phase signal and the weighted quadrature signal. The output of the adder 1116 may be amplified and/or buffered by amplifier 1118 to generate the cancellation signal.

By varying the relative strengths of the quadrature control input and the in-phase control input, the phase of the cancellation signal can be adjusted. By jointly increasing or decreasing the control inputs, the amplitude of the cancellation signal can be adjusted. The control inputs may be set to predetermined values, for example by analog biasing circuitry, or the control inputs may have values that are adjustable by digital-to-analog circuitry. It should be noted that the tuning circuit of FIG. 11 can be implemented in some instances with the use of conventional quadrature modulation circuitry, so long as the circuitry is capable of accepting DC values of the Q and I inputs. In conventional quadrature modulation circuitry, node 1100 is typically connected to a local oscillator. However, for the tuning componentry described herein, the node 1100 is connected to a source of a sample signal, such as a coupler that samples an outbound radio-frequency signal.

Figure 12:
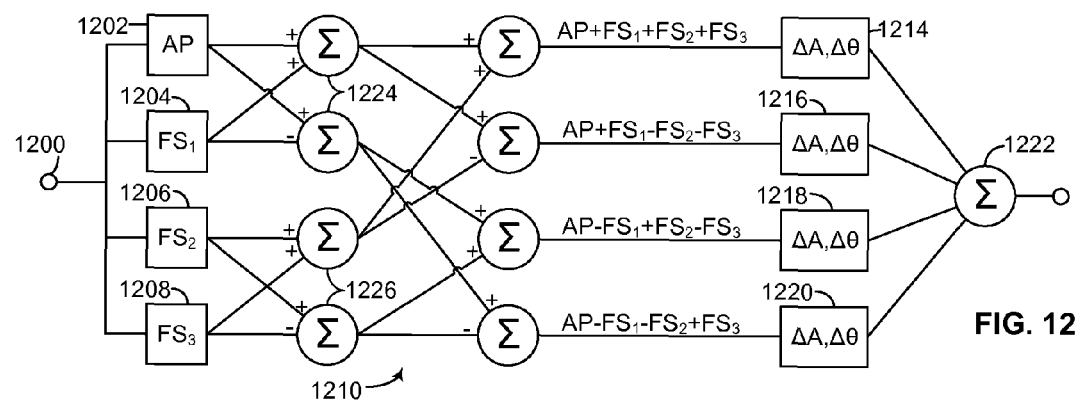

FIG. 12 illustrates another composite tuning component. An input at a node 1200 is provided to an all-pass filter 1202 and to three different frequency-selective filters 1204, 1206, 1208. The frequency-selective filters 1204, 1206, and 1208 may be bandpass filters with a constant magnitude and a linear phase. The phase components of these different filters are such that the phase of the first filter has a single sweep of 180° within the band of an outbound radio-frequency signal, the phase of the second filter has two sweeps of 180° within this band, and so on. In this regard, it should be noted that radio-frequency signals described herein are referred to as having a particular frequency, but as those of skill in the art understand, only a purely sinusoidal signal (which itself could convey no information) has just a single frequency component. All radio-frequency signals of practical interest have a nonzero width in the frequency domain. Thus, references herein to radio-frequency signals having the same frequency refer to a substantial overlap between the power spectra of the signals in the frequency domain.

In the tuning component of FIG. 12, the all-pass filtered and frequency-filtered signals are passed through a network 1210 of adders and subtractors that are operative to generate four sum-and-difference signals, namely:

$AP+FS_1+FS_2+FS_3$,
$AP+FS_1-FS_2-FS_3$,
$AP-FS_1+FS_2-FS_3$, and
$AP-FS_1-FS_2+FS_3$, where AP is the all-pass filtered signal, $FS_1$ is the output of filter 1204, $FS_2$ is the output of filter 1206, and $FS_3$ is the output of filter 1208. It may be noted that the signs of the different components have the form of a 4×4 Hadamard matrix, and that the sum of all four signals is simply 4AP. Those of ordinary skill in the art will recognize that, with reference to larger-dimensional Hadamard matrices, the principles disclosed herein can be applied to the design of tuning components with larger numbers of frequency-selective filters.

Each of the signals generated by the network 1210 of adders and subtractors is passed through a respective tuning component 1214, 1216, 1218, 1220, and the tuned outputs of those components are summed by an adder 1222 to generate a cancellation signal.

To economize the number of components, the adders and subtractors of the network 1210 may be implemented by components capable of both adding and subtracting signals, such as rat race couplers, magic tee couplers, or hybrid combiners. For example, the components AP and $FS_1$ may be both added and subtracted by a single rat race coupler 1224, and the components $FS_2$ and $FS_3$ may be both added and subtracted by a single rat race coupler 1226.

In general, it is difficult to construct filters that can divide such a relatively narrow band into disjoint parts. For example, consider a band of 20 Mhz at 2.6 Ghz and a band of 80 Mhz at 2.4 Ghz. There are SAW filters designed to cover these entire bands, but it is difficult to further divide these band into frequency segments that are significantly disjoint (non-overlapping) in frequency. However, it is easy to find filters (SAW) that cover the entire band (say of 20 Mhz or 80 Mhz in the above examples) with a flat gain, with a linear phase shift in their respective band, and with a phase shift across the band that has a linear slope and covers spans of multiples of 180°. The arrangement of filters disclosed herein allows the creation of a filter bank covering a plurality of bands with significantly disjoint spectra using available hardware. In addition, as the sum is a flat gain, the decomposition collectively forms a faithful representation of the signal. This maintains the signal features, and fine adjustments can be made around this starting point.

Figure 13:
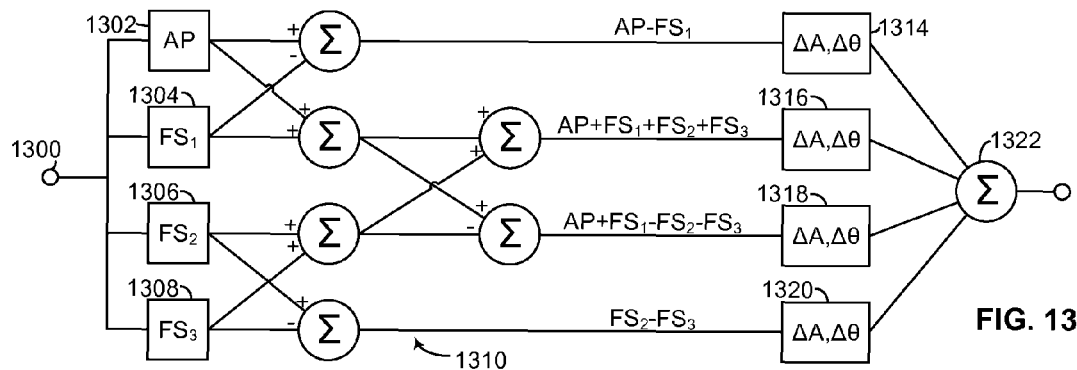

Whereas the tuning component of FIG. 12 may be considered to be analogous to a 4×4 Hadamard transform, the tuning component of FIG. 13 may be considered to be analogous to a 4×4 Haar transform. A sample signal provided at node 1300 is provided to an all-pass filter 1302 and to three different frequency-selective filters 1304, 1306, 1308. The frequency-selective filters 1304, 1306, and 1308 may be bandpass filters with a constant magnitude and a linear phase. The phase components of these different filters are such that the phase of the first filter has a single sweep of 180° within the band of an outbound radio-frequency signal, the phase of the second filter has two sweeps of 180° within this band, and so on. The all-pass filtered and frequency-filtered signals are passed through a network 1310 of adders and subtractors that are operative to generate four sum-and-difference signals, namely:

$AP-FS_1$,
$AP+FS_1+FS_2+FS_3$,
$AP+FS_1-FS_2-FS_3$, and
$FS_2-FS_3$, where AP is the all-pass filtered signal, $FS_1$ is the output of filter 1304, $FS_2$ is the output of filter 1306, and $FS_3$ is the output of filter 1308. The embodiment of FIG. 13 allows signals to be fed to four different tuning components without requiring as many adders and subtractors as the embodiment of FIG. 12. Each of the signals generated by the network 1310 of adders and subtractors is passed through a respective tuning component 1314, 1316, 1318, 1320, and the tuned outputs of those components are summed by an adder 1322 to generate a cancellation signal.

Figure 14:
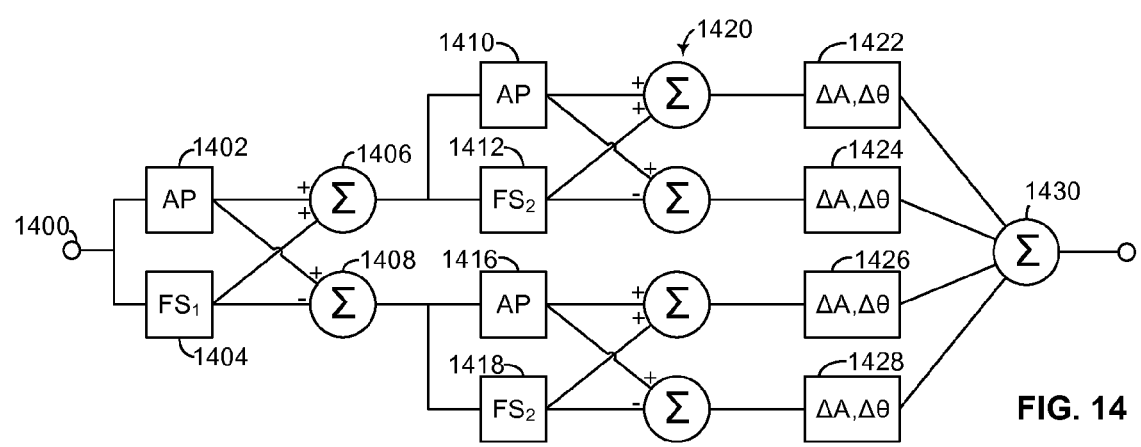

Another tuning component is illustrated in FIG. 14. A sample signal is provided at node 1400 and is supplied to an all-pass filter 1402 and a frequency-selective filter 1404. An adder 1406 and subtractor 1408 (which may be implemented by a single rat race coupler) generate frequency-selective sum and difference signals, respectively. The sum signal is in turn supplied to another all-pass filter 1410 and another frequency-selective filter 1412, and the difference signal is supplied to all-pass filter 1416 and frequency-selective filter 1418. Frequency-selective filters 1412 and 1418 preferably have the same frequency characteristics. The outputs of filters 1410, 1412, 1416, and 1418 are supplied to a sum and difference network 1420 to generate four frequency-dependent corrective signal components, each of which is passed through a respective tuning component 1422, 1424, 1426, 1428. The tuned outputs of the tuning components 1422, 1424, 1426, and 1428 are combined by a signal adder 1430 to generate a cancellation signal.

Figure 15A:
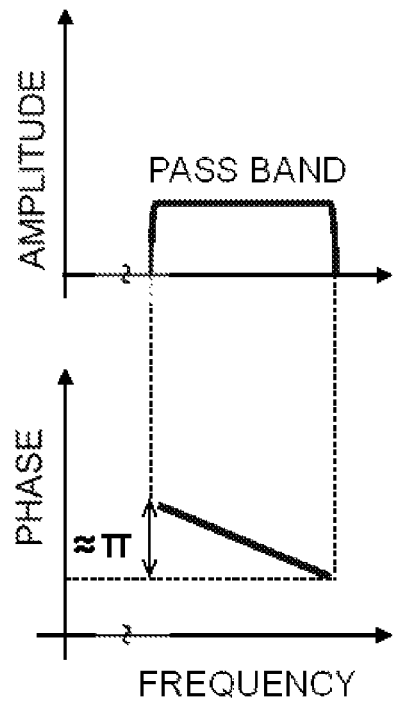
FIGS. 15A and 15B are graphs illustrating the properties of filters used in exemplary tuning components.
Figure 15B:
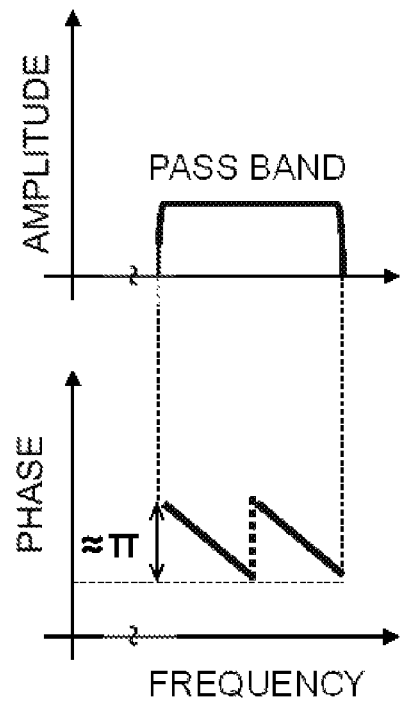

Exemplary characteristics of the frequency-selective filters used in the embodiment of FIG. 14 are illustrated in FIGS. 15A and 15B. The properties of frequency-selective filter 1404 ($FS_1$) is illustrated in FIG. 15A. As shown in FIG. 15A, filter 1404 introduces a frequency-dependent phase shift across the pass band, such that there is a 180° ($\pi$ radians) phase difference between the high-frequency and low-frequency ends of the pass band. The properties of frequency-selective filters 1412 and 1418 ($FS_2$) are illustrated in FIG. 15B. As shown in FIG. 15B, filters 1412 and 1418 introduce a frequency-dependent phase shift across the pass band, such that there is a 360° ($2\pi$ radians) phase difference between the high-frequency and low-frequency ends of the pass band. A filter having the desired properties can be implemented using, for example, surface acoustic wave (SAW) filter technology.

Figure 16:
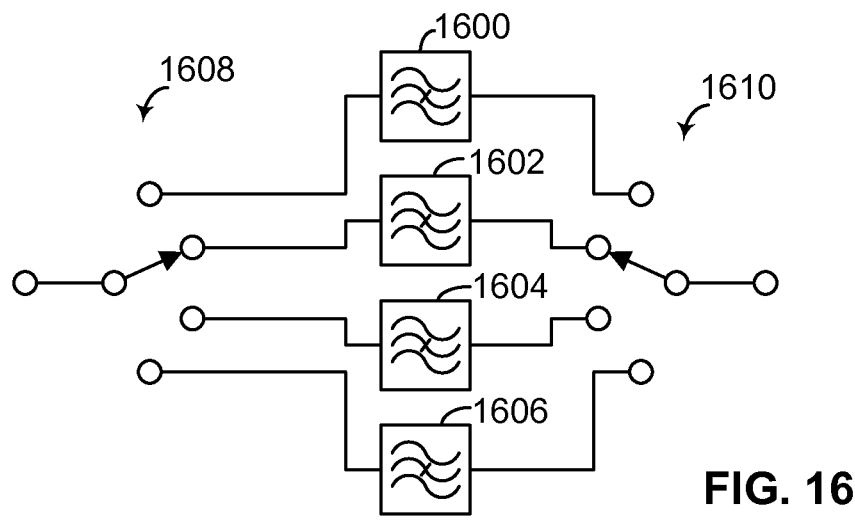
FIGS. 16-24 are functional block diagrams illustrating additional exemplary tuning components of a full-duplex transceiver adapter.

In some applications, the total available RF spectrum is composed of multiple frequency bands. For example, the 802.11 (WiFi) standard divides a total of about 80 MHz bandwidth into frequency bands (channels) of 20 MHz each. A WiFi transceiver can operate in any of these 20 MHz channels, and should support all of them. As illustrated in FIG. 16, a number of band-pass filters each covering a different channel, 1600, 1602, 1604, and 1606, in conjunction with switches 1608,1610 can be used to select a particular filter depending on the selected channel in order to support such a multi-channel operation. Each of these bandpass filters may be implemented by, for example, a series of two or more notch filters that remove frequencies outside the pass band of the respective band-pass filter.

Figure 17:
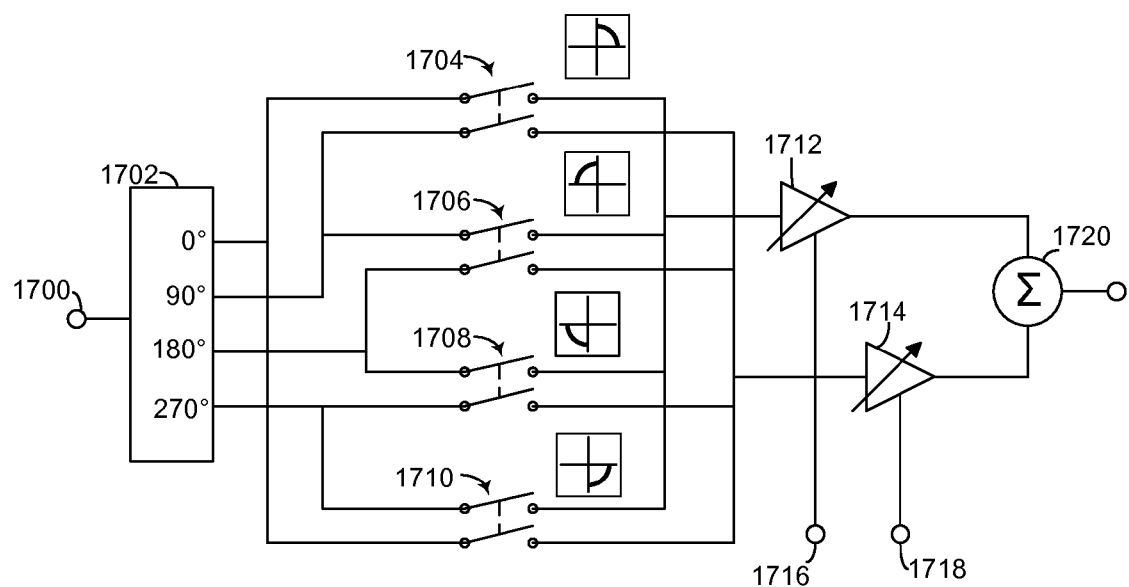

Another embodiment of a tuning component is illustrated in FIG. 17. A sample signal provided at node 1700 is supplied to a hybrid splitter 1702, which provides versions of the sample signal that are phase shifted by 0°, 90°, 180°, and 270°. Depending on the amount of phase shift that is desired, different combinations of phase-shifted sample signals are used. If a phase shift in the first quadrant (0° to 90°) is desired, switches 1704 are selected. If a phase shift in the second quadrant (90° to 180°) is desired, switches 1706 are selected. If a phase shift in the third quadrant (180° to 270°) is desired, switches 1708 are selected. If a phase shift in the fourth quadrant (270° to 360°) is desired, switches 1710 are selected. The selected phase-shifted samples are provided to a pair of adjustable-gain circuits 1712, 1714 controlled by input nodes 1716, 1718. The outputs of the adjustable-gain circuits 1716, 1718 are summed by an adder 1720 to generate a cancellation signal. By adjusting the relative gain of the two adjustable-gain circuits 1712, 1714, any phase shift in the selected quadrant can be achieved, according to the harmonic addition theorem of trigonometry.

Figure 18:
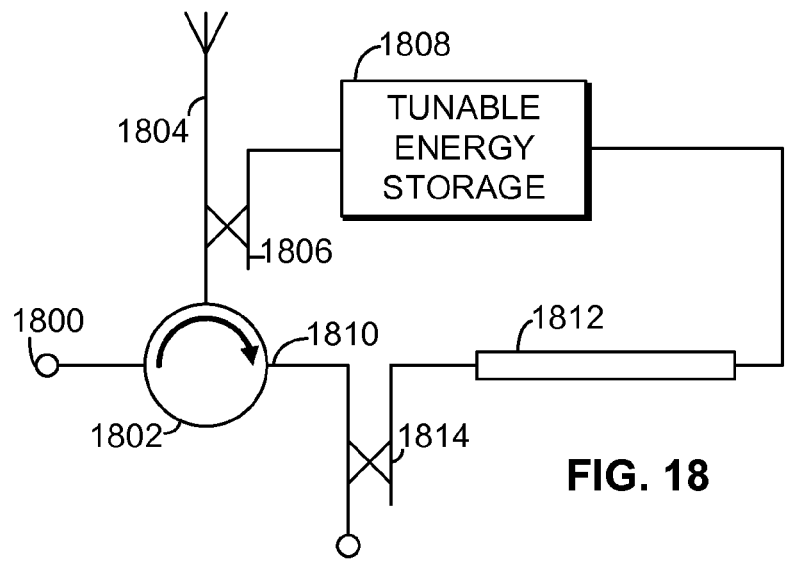

In some embodiments, tuning components can incorporate componentry present in some conventional transceivers, such as a radio-frequency circulator. The tuning components illustrated in FIGS. 18-20 make use of a radio-frequency circulator, which may be a circulator found in a conventional transceiver, or may be a circulator incorporated into a full-duplex transceiver adapter. In the embodiment of FIG. 18, an outbound radio-frequency signal is provided at node 1800 and supplied to circulator 1802. Circulator 1802 provides the outbound radio-frequency signal to an antenna 1804. The antenna 1804 also operates as a receive antenna, with any inbound radio-frequency signal received at antenna 1804 being directed to the receive output 1810 of the circulator.

A portion of the signal sent to the antenna 1804 is sampled by the radio-frequency coupler 1806. The sampled signal is provided to a tunable energy storage component 1808, which may be, for example, an adjustable capacitor, a transmission line with adjustable length, or an inductor to ground. When impedances connected to the circulator 1802 are matched, the circulator 1802 prevents the outbound radio-frequency signal from reaching the receive output 1810 of the circulator. The tunable energy storage component 1808, however, causes an impedance mismatch that leads some of the outbound radio-frequency signal to leak, with a phase shift, to the receive output 1810. At the same time, the sampled signal is provided to a tuning component 1812, which adjusts the phase and amplitude of the sampled signal to generate a cancellation signal. The cancellation signal is combined using a radio-frequency coupler 1814 with the inbound signal (which may include an inbound radio-frequency signal along with the leaked outbound signal) to cancel at least a portion of the self-interference component.

Figure 19:
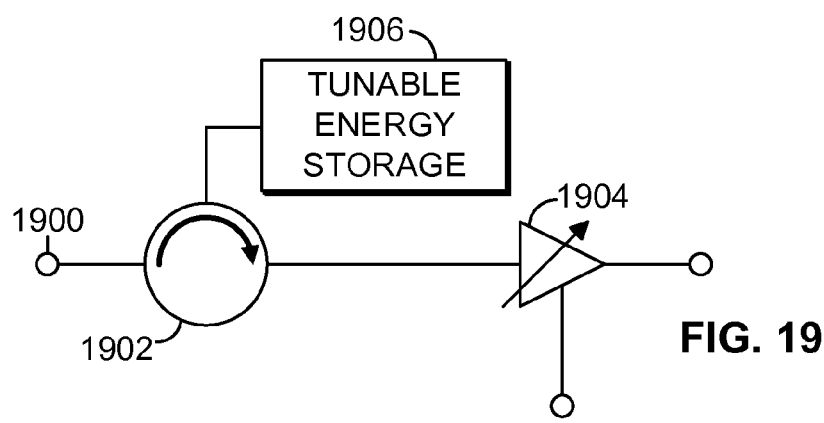

FIG. 19 illustrates another tuning component using a radio-frequency circulator. A sample signal is provided at node 1900 to the circulator 1902. A tunable energy storage component 1906 causes an adjustable impedance mismatch, which causes a phase-shifted replica of the sample signal to leak through the circulator to adjustable-gain circuitry 1904.

Figure 20:
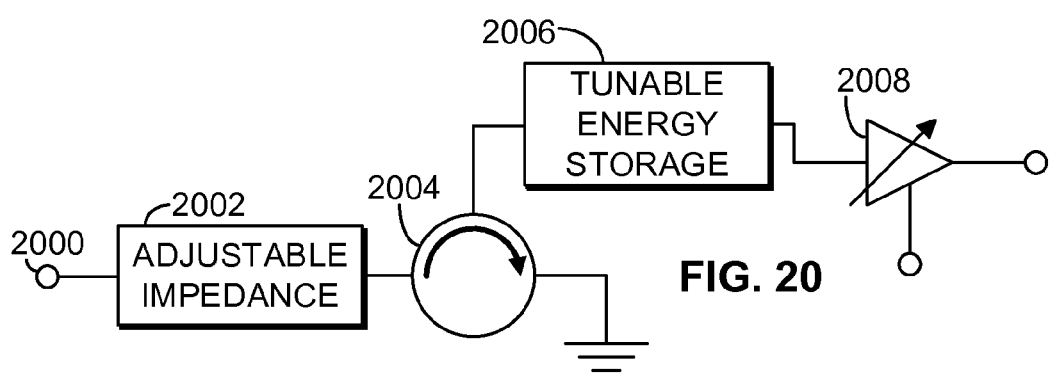

In the tuning component of FIG. 20, a sample signal is provided at node 2000 through an adjustable impedance 2002 to a circulator 2004. A tunable energy storage component 2006 introduces a variable impedance mismatch with the circulator 2004 that results in an adjustable phase shift. The phase shifted signal is supplied to adjustable-gain circuitry 2008 to generate a cancellation signal with the proper phase and amplitude.

Figure 21:
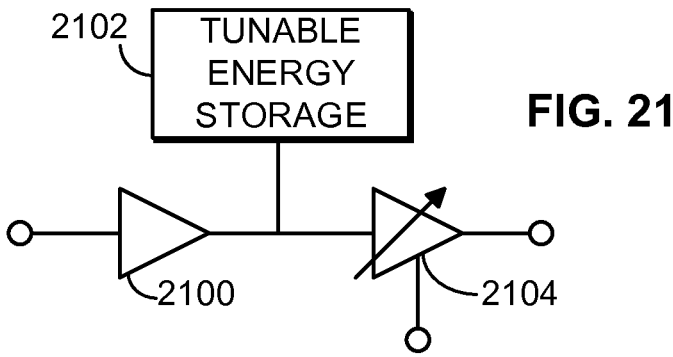

Additional tuning components are illustrated in FIGS. 21-24. In FIG. 21, a sample signal passes through an amplifier of other radio-frequency buffer 2100. A phase shift is introduced by a tunable energy storage component 2102, and the amplitude of the resulting cancellation signal is controlled by adjustable-gain circuitry 2104.

Figure 22:
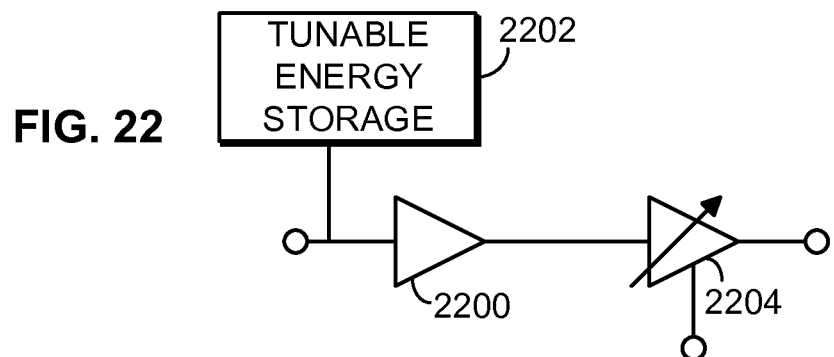

In FIG. 22, the phase of a sample signal is shifted by tunable energy storage component 2202 before the signal is supplied to a radio-frequency buffer 2200. The amplitude of the resulting cancellation signal is controlled by adjustable-gain circuitry 2204.

Figure 23:
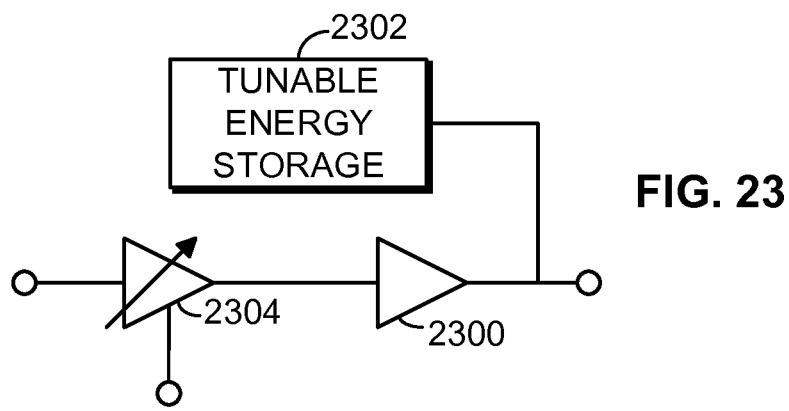

In FIG. 23, the amplitude of a sample signal is first adjusted by adjustable-gain circuitry 2304 before being passed through a radio-frequency buffer 2300. The signal from the radio-frequency buffer 2300 is phase shifted by tunable energy-storage component 2302.

Figure 24:
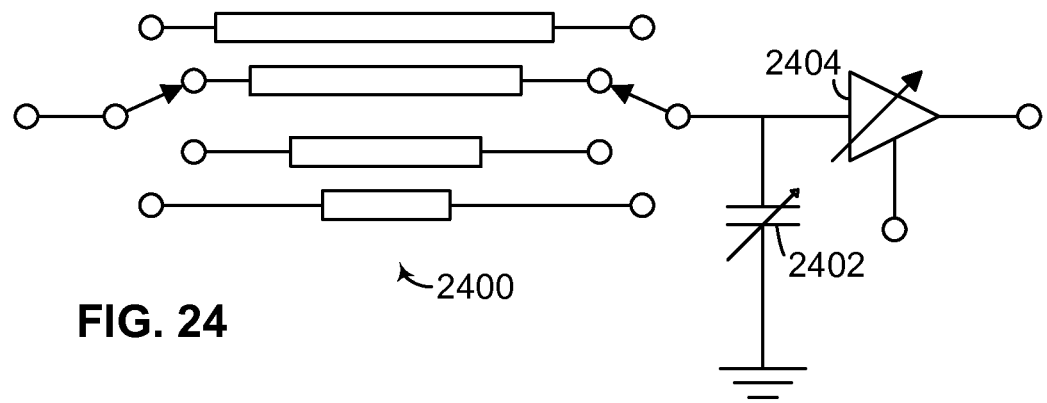

In FIG. 24, the phase of a sample signal is adjusted with the use of a selectable bank 2400 of delay lines of different length and an adjustable capacitor 2402. The amplitude of the resulting cancellation signal is controlled by adjustable-gain circuitry 2404.

Figure 25:
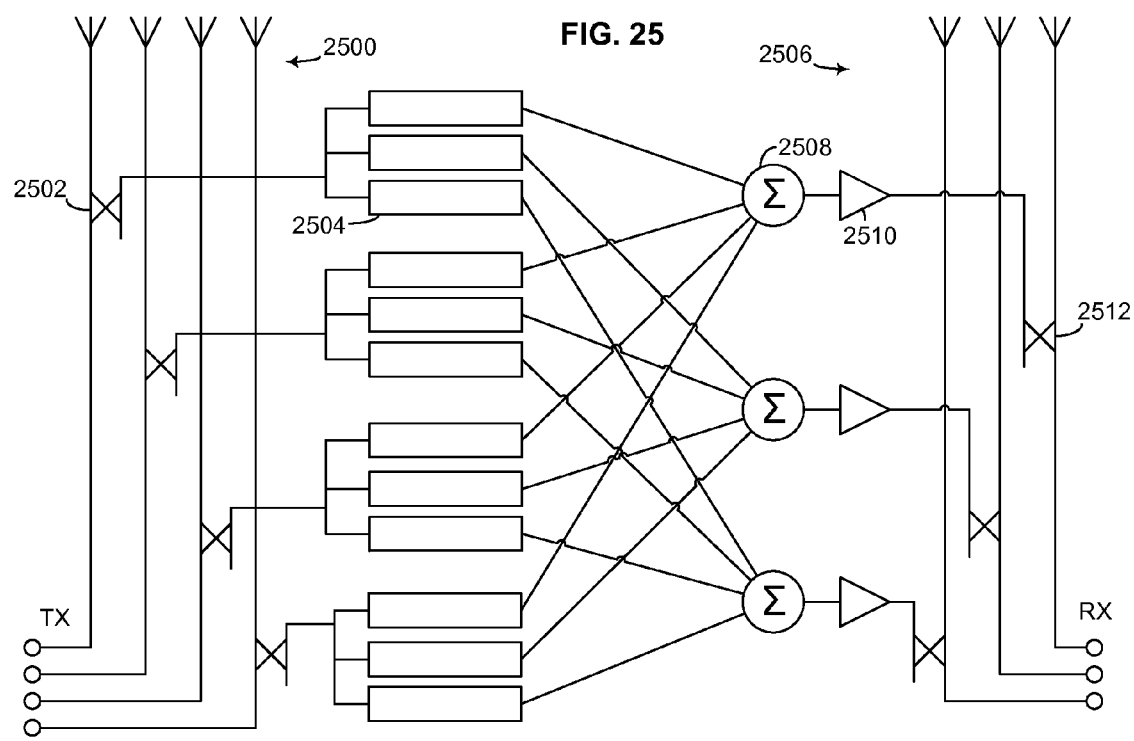
FIG. 25 is a functional block diagram of radio-frequency cancellation componentry in a full-duplex transceiver adapter using multiple-input multiple-output (MIMO) antenna topology.

The structures and techniques described herein can be implemented not only with a single transmit and single receive antenna, but also with MIMO (multiple-input and multiple-output) topology employing multiple transmit and multiple receive antennas. Components of an exemplary MIMO transceiver adapter are illustrated in FIG. 25. For clarity, the components involved in demodulation, baseband processing, and re-modulation are not illustrated in FIG. 25, which focuses on the topology of the radio-frequency cancellation paths. In the system of FIG. 25, outbound radio frequency signals bound for a bank 2500 of transmit antennas are sampled by a plurality of radio-frequency couplers, such as coupler 2502. Each of the sample signals is provided to one tuning component (such as tuning component 2504) for each receive antenna in bank 2506 of receive antennas. That is, in a system with N transmit antennas and L receive antennas, each of the sample signals is provided to L tuning components, for a total of N×L tuning components, each of which generates a cancellation signal.

A signal adder, such as adder 2508, is associated with each of the receive antennas (for a total of L adders). Each of the L adders combines the N cancellation signals that are destined for its associated antenna to generate a combined cancellation signal. Radio-frequency isolators, such as buffer 2510, isolate the cancellation circuitry from the receive antennas. Each of the combined cancellation signals is combined with a respective inbound radio-frequency signal through a radio-frequency coupler, such as coupler 2512.

The invention claimed is:

1. A method comprising:
   receiving an outbound radio-frequency signal from a transceiver;
   receiving a first inbound radio-frequency signal from an antenna, wherein the inbound radio frequency signal includes a self-interference component and a desired radio frequency component;
   generating a first analog corrective signal from the outbound radio-frequency signal;

combining the first analog corrective signal with the first inbound radio-frequency signal to generate a second inbound radio-frequency signal with reduced self-interference;

shifting the frequency of at least one of the received outbound radio-frequency signal and the second inbound radio-frequency signal;

transmitting the outbound radio-frequency signal at the same frequency as the desired radio-frequency component; and providing the second inbound radio-frequency signal to the transceiver at a frequency different from the frequency of the received outbound radio-frequency signal.

2. The method of claim 1, wherein the shifting is performed on the received outbound radio-frequency signal, the shifting comprising:

demodulating the received outbound radio-frequency signal to generate a demodulated outbound signal; and modulating the demodulated outbound signal at a radio frequency different from the frequency of the received outbound radio frequency signal.

3. The method of claim 1, wherein the shifting is performed on the second inbound radio-frequency signal, the shifting comprising:

demodulating the second inbound radio-frequency signal to generate a demodulated inbound signal; and modulating the demodulated inbound signal at a radio frequency different from the frequency of the second inbound radio-frequency signal.

4. The method of claim 1, wherein the shifting is performed on both the received outbound radio-frequency signal and the second inbound radio-frequency signal.

5. The method of claim 1, wherein generating a first analog corrective signal comprises:

sampling the outbound radio-frequency signal; and adjusting the phase and amplitude of the sampled outbound radio-frequency signal to generate the first analog corrective signal.

6. The method of claim 5, wherein adjusting the phase and amplitude of the radio-frequency corrective signal comprises:

separating the sampled outbound radio-frequency signal into a plurality of frequency-dependent corrective signal components;

separately adjusting the phase and amplitude of each of the frequency-dependent corrective-signal components; and combining the adjusted frequency-dependent corrective-signal components.

7. The method of claim 6, wherein the separating of the sampled outbound radio-frequency signal into a plurality of frequency-dependent corrective signal components includes:

passing the first analog corrective signal through an all-pass filter to generate an all-pass filtered signal;

passing the first analog corrective signal through a frequency-dependent filter to generate a frequency-filtered signal;

generating a first frequency-dependent corrective signal by adding the all-pass filtered signal to the frequency-filtered signal; and generating a second frequency-dependent corrective signal by subtracting the frequency-filtered signal from the all-pass filtered signal.

8. The method of claim 7, wherein the adding and subtracting are performed with a rat race coupler.

9. The method of claim 7, wherein the adding and subtracting are performed with a magic tee coupler.

10. The method of claim 7, wherein the adding and subtracting are performed with a hybrid combiner.

11. The method of claim 5, wherein the adjusting of the phase and amplitude of the sampled outbound radio-frequency signal is perfumed with a radio-frequency circulator.

12. The method of claim 5, wherein the adjusting of the phase and amplitude of the sampled outbound radio-frequency signal includes providing the sampled outbound radio-frequency signal to a local oscillator input of a radio-frequency modulator circuit.

13. The method of claim 5, further comprising:

sampling the first analog corrective signal;

adjusting the amplitude and phase of the sampled first analog corrective signal to generate a corrective feedback signal; and combining the corrective feedback signal with the sampled outbound radio-frequency signal.

14. The method of claim 1, further comprising:

sampling the second inbound radio-frequency signal;

adjusting the amplitude and phase of the sampled second inbound radio-frequency signal to generate a corrective feedback signal; and combining the corrective feedback signal with the outbound radio frequency signal.

15. The method of claim 1, further comprising:

generating a second analog corrective signal based on the outbound radio-frequency signal; and combining the second analog corrective signal with the second inbound radio-frequency signal to further reduce the self-interference component.

16. A method comprising:

receiving a first outbound radio-frequency signal from a transceiver;

demodulating the first outbound radio-frequency signal to generate a demodulated outbound signal;

modulating the demodulated outbound signal to generate a second outbound radio-frequency signal;

generating a first analog corrective signal based on the second outbound radio-frequency signal;

transmitting the second outbound radio-frequency signal;

receiving a first inbound radio frequency signal, wherein the first inbound radio-frequency signal includes a radio-frequency self-interference component and a desired radio frequency component at the same frequency as the second outbound radio frequency signal;

combining the first analog corrective signal with the first inbound radio frequency signal to reduce the radio-frequency self-interference component;

demodulating the second inbound radio-frequency signal to generate a demodulated inbound signal;

modulating the demodulated inbound signal to generate a second inbound radio-frequency signal at a frequency different from the first outbound radio-frequency signal; and providing the second inbound radio-frequency signal to the transceiver.

17. The method of claim 16, wherein the demodulated inbound signal includes a demodulated self-interference component, further comprising:

generating a second analog corrective signal based on the demodulated outbound signal; and combining the second analog corrective signal with the demodulated inbound signal to reduce the demodulated self-interference component.

18. The method of claim 17, wherein the demodulated outbound signal is an intermediate-frequency signal.

19. The method of claim 18, wherein the demodulated outbound signal is a baseband signal.

20. A full-duplex transceiver adapter comprising:
an outbound radio-frequency connection node operative to receive a first outbound radio-frequency signal;
an outbound radio-frequency demodulator operative to demodulate the first outbound radio frequency signal at a first radio frequency to generate a demodulated outbound signal;
an outbound radio-frequency modulator operative to modulate the demodulated outbound signal at a second radio frequency to generate a second outbound radio-frequency signal;
a transmit antenna connected to an output of the outbound radio-frequency modulator;
a receive antenna operative to receive a first inbound radio-frequency signal; and
an inbound radio-frequency demodulator operative to demodulate the first inbound radio frequency signal at the second radio frequency to generate a demodulated inbound signal;
an inbound radio-frequency modulator operative to modulate the demodulated inbound signal at a third radio frequency different from the first radio frequency to generate a second inbound radio-frequency signal; and
an inbound radio-frequency connection node connected to an output of the inbound radio-frequency modulator.

21. The adapter of claim 20, further comprising a radio-frequency cancellation path connected between the output of the outbound radio-frequency modulator and an input of the inbound radio-frequency demodulator.

22. The adapter of claim 21, further comprising at least one tuning component on the radio-frequency cancellation path.

23. The adapter of claim 21, wherein the radio-frequency cancellation path includes:
a first radio-frequency coupler operative to sample the second outbound radio-frequency signal to generate a sample signal;
at least one frequency-selective filter operative to generate a filtered signal from the sample signal;
a first adder operative to generate a sum signal representing a sum of the sample signal and the filtered signal;
a subtractor operative to generate a difference signal representing a difference between the sample signal and the filtered signal;
a first tuning component operative to tune the phase and amplitude of the sum signal to generate a tuned sum signal;
a second tuning component operative to tune the phase and amplitude of the difference signal to generate a tuned difference signal;
a second adder operative to add the tuned sum and tuned difference signals to generate a cancellation signal; and
a second radio frequency coupler operative to combine the cancellation signal with the first inbound radio-frequency signal.

24. The adapter of claim 20, further comprising a baseband cancellation path connected between an output of the outbound radio-frequency demodulator and an input of the inbound radio-frequency modulator.

* * * * *